(12) United States Patent
Sutardja

(10) Patent No.: US 7,657,160 B2
(45) Date of Patent: *Feb. 2, 2010

(54) UNIFIED CONTROL AND MEMORY FOR A COMBINED DVD/HDD SYSTEM

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 787 days.

This patent is subject to a terminal disclaimer.

(21) Appl. No.: 11/077,394

(22) Filed: Mar. 10, 2005

(65) Prior Publication Data

US 2006/0056814 A1 Mar. 16, 2006

Related U.S. Application Data

(63) Continuation of application No. 11/039,288, filed on Jan. 19, 2005.

(60) Provisional application No. 60/609,889, filed on Sep. 14, 2004.

(51) Int. Cl.
*H04N 5/00* (2006.01)
*H04N 5/91* (2006.01)
*H04N 5/445* (2006.01)
*H04N 7/26* (2006.01)
*H04N 7/167* (2006.01)
*G06F 5/00* (2006.01)
*G06F 13/38* (2006.01)
*G06F 17/30* (2006.01)
*G06K 19/00* (2006.01)
*G11B 19/02* (2006.01)
*G11B 27/36* (2006.01)

(52) U.S. Cl. ............... 386/125; 386/109; 386/112; 386/124; 386/126; 386/131; 360/69; 369/47.1; 369/53.1; 380/201; 380/203; 710/52; 710/65; 725/55; 726/4; 726/17; 726/21; 726/26

(58) Field of Classification Search ............... 386/125, 386/109, 112, 124, 126, 131, E5.001, E9.013; 348/E5.004, E5.007, E7.056, E7.061; 360/69; 369/47.1, 53.1; 380/201, 203; 704/E19.009; 705/51, 57; 709/217; 719/313; 725/55; 726/4, 17, 21, 26

See application file for complete search history.

(56) References Cited

U.S. PATENT DOCUMENTS 5,410,694 A * 4/1995 Uchida et al. ............... 707/1

(Continued)

FOREIGN PATENT DOCUMENTS

EP 0978839 A1 * 2/2000

(Continued)

OTHER PUBLICATIONS

Kostelijk; "Misleading Architecting Tradeoffs"; IEEE Computer Society, vol. 38, No. 5; May 2005; pp. 20-26.

(Continued)

*Primary Examiner*—Thai Tran
*Assistant Examiner*—Syed Y Hasan

(57) ABSTRACT

A combined digital versatile disc (DVD)/hard disk drive (HDD) system controls a HDD assembly and a DVD assembly comprises a DVD/HDD control module controls operation of the HDD assembly and the DVD assembly. Volatile memory communicates with the DVD/HDD control module and stores volatile data relating to the operation of the DVD assembly and the HDD assembly. Nonvolatile memory communicates with the DVD/HDD control module and stores nonvolatile data relating to the operation of the DVD assembly and the HDD assembly.

33 Claims, 19 Drawing Sheets

U.S. PATENT DOCUMENTS

| | | | |
|---|---|---|---|
| 5,668,987 | A | 9/1997 | Schneider |
| 6,311,214 | B1 * | 10/2001 | Rhoads ........................ 709/217 |
| 6,526,574 | B1 | 2/2003 | Jones |
| 6,550,011 | B1 | 4/2003 | Sims, III |
| 6,678,226 | B2 | 1/2004 | Horibata et al. |
| 6,882,493 | B2 * | 4/2005 | Denda et al. .................. 360/69 |
| 7,117,392 | B2 * | 10/2006 | Lee ............................. 714/24 |
| 7,254,318 | B2 * | 8/2007 | Imada et al. ................. 386/112 |
| 7,373,521 | B1 * | 5/2008 | Kawahara .................... 713/193 |
| 7,392,541 | B2 * | 6/2008 | Largman et al. ............... 726/17 |
| 2001/0043530 | A1 | 11/2001 | Nakatsuka et al. |
| 2002/0013871 | A1 | 1/2002 | Kakiage |
| 2002/0023219 | A1 | 2/2002 | Treffers et al. |
| 2003/0051090 | A1 | 3/2003 | Bonnett et al. |
| 2003/0078891 | A1 * | 4/2003 | Capitant ....................... 705/57 |
| 2003/0099460 | A1 | 5/2003 | Imada et al. |
| 2003/0118330 | A1 * | 6/2003 | Ito et al. ...................... 386/131 |
| 2003/0152372 | A1 | 8/2003 | Shimizu et al. |
| 2003/0184572 | A1 * | 10/2003 | Kaise .......................... 345/698 |
| 2003/0218950 | A1 | 11/2003 | Yamada |
| 2004/0033059 | A1 * | 2/2004 | Kim et al. ................... 386/113 |
| 2004/0075932 | A1 | 4/2004 | Watson |
| 2005/0251829 | A1 * | 11/2005 | Kondo et al. .................. 725/55 |
| 2005/0265166 | A1 | 12/2005 | Itoh |
| 2006/0028936 | A1 * | 2/2006 | Ninomiya et al. .......... 369/47.1 |
| 2006/0056811 | A1 | 3/2006 | Sutardja |
| 2006/0056813 | A1 | 3/2006 | Sutardja |
| 2006/0056814 | A1 * | 3/2006 | Sutardja ..................... 386/125 |
| 2006/0056815 | A1 | 3/2006 | Sutardja |

FOREIGN PATENT DOCUMENTS

| | | |
|---|---|---|
| EP | 1 018 733 | 7/2000 |
| EP | 1 103 973 | 5/2001 |
| EP | 1 280 154 | 1/2003 |
| EP | 1 353 331 | 10/2003 |
| EP | 1 376 571 | 1/2004 |
| EP | 1 377 050 | 1/2004 |
| EP | 1388858 A1 * | 2/2004 |

OTHER PUBLICATIONS

Sirouk; "DCS—Direct Copy Suite Review by CDR-Zone"; Jun. 26, 2003; pp. 1-5.

Tomdownload.com; "Super Clone DVD 4.0.7"; Feb. 29, 2004; pp. 1-2.

Bladeenc.Mp3.No; "The Truth about the DVD Case"; Mar. 5, 2000; pp. 1-4.

Pcdmicha; "Elby CLoneDVD—Genial and Legal"; Wintotal.De; Jul. 20, 2003; pp. 1-6.

Communication from the European Patent Office dated Aug. 16, 2007 with the extended European Search Report for Application No. 05 018 815.0-2223; 9 pages.

Communication from the European Patent Office dated Aug. 20, 2007 with the extended European Search Report for Application No. 05 018 615.4-2223; 8 pages.

* cited by examiner

UNIFIED CONTROL AND MEMORY FOR A COMBINED DVD/HDD SYSTEM

CROSS-REFERENCE TO RELATED APPLICATIONS

This application is a continuation of U.S. Ser. No. 11/039,288, filed Jan. 19, 2005, which claims the benefit of U.S. Provisional Application No. 60/609,889, filed on Sep. 14, 2004. The disclosure of the above applications are incorporated herein by reference.

FIELD OF THE INVENTION

The present invention relates to hard disk drive (HDD) systems and digital versatile disc (DVD) systems, and more particularly to combined HDD/DVD systems.

BACKGROUND OF THE INVENTION

Nonvolatile data storage systems include digital versatile disc (DVD) systems and hard disc drive (HDD) systems. DVD systems store data optically while HDD systems store data magnetically. In systems having both DVD and HDD subsystems, each subsystem generally has its own CPU, external DRAM buffer and flash memory to handle both temporary data storage and control code storage.

Referring now to FIG. 1, a HDD system 10 is shown to include a HDD PCB 14. A buffer 18 stores read, write and/or volatile control data that is associated the control of the HDD system 10. The buffer 18 usually employs volatile memory having low latency. For example, SDRAM or other types of low latency memory may be used. Nonvolatile memory 19 such as flash memory may also be provided to store critical data such as nonvolatile control code.

A processor 22 arranged on the HDD PCB 14 performs data and/or control processing that is related to the operation of the HDD system 10. A hard disk control module (HDC) 26 communicates with an input/output interface 24 and with a spindle/voice coil motor (VCM) driver or module 30 and/or a read/write channel module 34. The HDC 26 coordinates control of the spindle/VCM driver 30, the read/write channel module 34 and the processor 22 and data input/output with a host 35 via the interface 24.

During write operations, the read/write channel module 34 encodes the data to be written onto a read/write device 59. The read/write channel module 34 processes the write signal for reliability and may apply, for example, error correction coding (ECC), run length limited coding (RLL), and the like. During read operations, the read/write channel module 34 converts an analog read signal output of the read/write device 59 to a digital read signal. The converted signal is then detected and decoded by known techniques to recover the data that was written on the HDD.

A hard disk drive assembly (HDDA) 50 includes one or more hard drive platters 52 that include magnetic coatings that store magnetic fields. The platters 52 are rotated by a spindle motor that is schematically shown at 54. Generally the spindle motor 54 rotates the hard drive platter 52 at a controlled speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

The read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDDA 50 includes a preamp circuit 60 that amplifies the analog read/write signals. When reading data, the preamp circuit 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platter 52 and is used to represent data.

Portions of the HDD system 10 may be implemented by a one or more integrated circuits (IC) or chips. For example, the processor 22 and the HDC 26 may be implemented by a single chip. The spindle/VCM driver 30 and/or the read/write channel module 34 may also be implemented by the same chip as the processor 22, the HDC 26 and/or by additional chips. Alternately, most of the HDD system 10 other than the HDDA 50 may be implemented as a system on chip (SOC).

Referring now to FIG. 2, a DVD system 110 is shown to include a DVD PCB 102, which includes a buffer 118 that stores read data, write data and/or volatile control code that is associated the control of the DVD system 110. The buffer 118 may employ volatile memory such as SDRAM or other types of low latency memory. Nonvolatile memory 119 such as flash memory can also be used for critical data such as data relating to DVD write formats and/or other nonvolatile control code. A processor 122 arranged on the DVD PCB 102 performs data and/or control processing that is related to the operation of the DVD system 110. The processor 122 also performs decoding of copy protection and/or compression/decompression as needed. A DVD control module 126 communicates with an input/output interface 124 and with a spindle/feed motor (FM) driver 130 and/or a read/write channel module 134. The DVD control module 126 coordinates control of the spindle/FM driver, the read/write channel module 134 and the processor 122 and data input/output via the interface 124.

During write operations, the read/write channel module 134 encodes the data to be written by an optical read/write (ORW) or optical read only (OR) device 159 to the DVD platter. The read/write channel module 134 processes the signals for reliability and may apply, for example, ECC, RLL, and the like. During read operations, the read/write channel module 134 converts an analog output of the ORW or OR device 159 to a digital signal. The converted signal is then detected and decoded by known techniques to recover the data that was written on the DVD.

A DVD assembly (DVDA) 150 includes a DVD platter 152 that stores data optically. The platter 152 is rotated by a spindle motor that is schematically shown at 154. The spindle motor 154 rotates the DVD platter 152 at a controlled and/or variable speed during the read/write operations. The ORW or OR device 159 moves relative to the DVD platter 152 to read and/or write data to/from the DVD platter 52. The ORW or OR device 159 typically includes a laser and an optical sensor.

For DVD read/write and DVD read only systems, the laser is directed at tracks on the DVD that contain lands and pits during read operations. The optical sensor senses reflections caused by the lands/pits. For DVD read/write (RW) applications, a laser may also be used to heat a die layer on the DVD platter during write operations. If the die is heated to one temperature, the die is transparent and represents one binary digital value. If the die is heated to another temperature, the die is opaque and represents the other binary digital value.

The spindle/FM driver 30 controls the spindle motor 154, which controllably rotates the DVD platter 152. The spindle/FM driver 130 also generates control signals that position the feed motor 158, for example using a voice coil actuator, a stepper motor or any other suitable actuator. The feed motor 158 typically moves the ORW or OR device 159 radially relative to the DVD platter 152. A laser driver 161 generates a laser drive signal based on an output of the read/write channel module 134. The DVDA 50 includes a preamp circuit 160 that amplifies analog read signals. When reading data, the preamp circuit 160 amplifies low level signals from the ORW or OR device and outputs the amplified signal to the read/write channel module device 134.

The DVD system 110 further includes a codec module 140 that encodes and/or decodes video such as any of the MPEG formats. Audio and/or video digital signal processors and/or modules 142 and 144, respectively, perform audio and/or video signal processing, respectively.

As with the HDD system 10, portions of the DVD system 110 may be implemented by one or more integrated circuits (IC) or chips. For example, the processor 22 and the DVD control module 126 may be implemented by a single chip. The spindle/FM driver 130 and/or the read/write channel module 134 may also be implemented by the same chip as the processor 122, the DVD control module 126 and/or by additional chips. Most of the DVD system 110 other than the DVDA 150 may also be implemented as a SOC.

DVD players typically include only one DVD player, which makes copying DVDs difficult. To copy the DVD, the user must copy the DVD contents to a hard drive of a computer. Typically, copy protection schemes such as digital rights management (DRM) prevent such copying despite the fact that some copying may be allowed under the copyright laws. This is due, in part, to the fact that the data is decrypted and/or decoded by the DVD system 110 and is therefore in an unprotected form when it is output to other devices.

SUMMARY OF THE INVENTION

A combined digital versatile disc (DVD)/hard disk drive (HDD) system that controls a HDD assembly and a DVD assembly comprises a DVD/HDD control module that controls operation of the HDD assembly and the DVD assembly. Volatile memory communicates with the DVD/HDD control module and stores volatile data relating to the operation of the DVD assembly and the HDD assembly. Nonvolatile memory communicates with the DVD/HDD control module and stores nonvolatile data relating to the operation of the DVD assembly and the HDD assembly.

In other features, a video decompression module communicates with the DVD/HDD control module and decompresses video data stored on at least one of the DVD assembly and/or the HDD assembly. A video compression module communicates with the DVD/HDD control module and compresses video data for storage on at least one of the DVD assembly and/or the HDD assembly.

In other features, a spindle driver communicates with the DVD/HDD control module and controls a spindle motor of the DVD assembly. A first driver communicates with the DVD/HDD control module and adjusts a location of one of an optical read/write device or an optical read only device of the DVD assembly. A spindle driver communicates with the DVD/HDD control module and controls a spindle motor of the HDD assembly. A second driver communicates with the DVD/HDD control module and controls a read/write arm of the HDD assembly.

In still other features, a read/write channel module communicates with the DVD/HDD control module and processes read data from and write data to the HDD and DVD assemblies. An interface communicates with the DVD/HDD control module and a host interface. The DVD/HDD control module buffers read data to nonvolatile memory of the HDD assembly during read operations. The read data buffer is located in a hidden portion of the nonvolatile memory of the HDD assembly. The DVD/HDD control module dynamically adjusts a size of the read data buffer in the nonvolatile memory of the HDD assembly.

In other features, the DVD/HDD control module buffers write data to nonvolatile memory of the HDD assembly during write operations. The write data buffer is located in a hidden portion of the nonvolatile memory of the HDD assembly. The DVD/HDD control module dynamically adjusts a size of the write data buffer in the nonvolatile memory of the HDD assembly. The DVD/HDD control module stores data including copy protection data from a DVD medium in nonvolatile memory of the HDD assembly. The DVD/HDD control module stores data including copy protection data from a plurality of DVD media in nonvolatile memory of the HDD assembly.

In other features, the DVD/HDD control module stores DVD write format data in nonvolatile memory of the HDD assembly. A system comprises the combined DVD/HDD system and further comprises the HDD assembly and the DVD assembly. The DVD/HDD control module is implemented as an integrated circuit. The volatile memory includes SDRAM. The nonvolatile memory includes flash memory. When the DVD/HDD control module receives a HDD write request while buffering DVD write data to the HDD, the DVD/HDD control module assigns a higher priority to DVD write data buffering. When a file is read from the DVD, the DVD/HDD control module buffers the sequential access file to the HDD. The DVD/HDD control module reduces power to the DVD after buffering the file to the HDD. The DVD/HDD control module slows a rotational speed of the DVD. The DVD/HDD control module stops rotation of the DVD. When a file is read from the DVD, the DVD/HDD control module buffers a portion of the file to the HDD.

In other features, the DVD/HDD control module reduces power to the DVD after buffering the portion of the file to the HDD. The DVD/HDD control module buffers another portion of the file to the HDD prior to completion of reading the portion from the HDD. The DVD/HDD control module slows a rotational speed of the DVD. The DVD/HDD control module stops rotation of the DVD.

A DVD copying system comprises a hard disk drive (HDD) assembly that includes nonvolatile memory. A digital versatile disc (DVD) assembly selectively reads DVD content with copy protection from a DVD medium. A combined HDD/DVD control module communicates with the HDD assembly and the DVD assembly and selectively copies the DVD content with the copy protection to the nonvolatile memory of the HDD assembly.

In other features, the copy protection includes digital rights management (DRM) data. Volatile and nonvolatile memory stores data relating to the operation of both the DVD and HDD assemblies. The combined HDD/DVD control module is implemented as an integrated circuit. The DVD content with the copy protection are copied to a hidden portion of the nonvolatile memory in the HDD assembly.

A virtual DVD carousel comprises the DVD copying system wherein DVD content with copy protection from multiple DVD media is stored in the nonvolatile memory of the HDD assembly.

In other features, the combined DVD/HDD control module allows playback of the DVD content N times and then makes the DVD content unavailable. The combined DVD/HDD control module allows playback of the DVD content for a predetermined period and then makes the DVD content unavailable. The DVD/HDD control module may delete the DVD content from the HDD.

An integrated circuit for a combined digital versatile disc (DVD)/hard disk drive (HDD) system that controls a HDD assembly and a DVD assembly comprises a HDD read/write channel module that communicates with the HDD assembly and that processes read data from and write data to the HDD assembly. A DVD read channel module communicates with the DVD assembly and processes read data from the DVD assembly.

In other features, a system comprises the integrated circuit and further comprises the HDD assembly and the DVD assembly. A DVD/HDD control module communicates with the HDD read/write channel module and the DVD read channel module and controls operation of the HDD assembly and the DVD assembly. Volatile memory communicates with the DVD/HDD control module and stores volatile data relating to the operation of the DVD assembly and the HDD assembly. Nonvolatile memory communicates with the DVD/HDD control module and stores nonvolatile data relating to the operation of the DVD assembly and the HDD assembly.

In other features, a video decompression module communicates with the DVD/HDD control module and decompresses video data stored on at least one of the DVD assembly and/or the HDD assembly. A video compression module communicates with the DVD/HDD control module and compresses video data for storage on at least one of the DVD assembly and/or the HDD assembly. The DVD read channel module also processes write data to the DVD assembly.

In other features, a spindle driver communicates with the DVD/HDD control module and controls a spindle motor of the DVD assembly. A first driver communicates with the DVD/HDD control module and adjusts a location of one of an optical read/write device or an optical read only device of the DVD assembly. A spindle driver communicates with the DVD/HDD control module and controls a spindle motor of the HDD assembly. A second driver communicates with the DVD/HDD control module and controls a read/write arm of the HDD assembly.

In other features, the DVD/HDD control module buffers read data to nonvolatile memory of the HDD assembly during read operations. The read data buffer is located in a hidden portion of the nonvolatile memory of the HDD assembly. The DVD/HDD control module dynamically adjusts a size of the read data buffer in the nonvolatile memory of the HDD assembly. The DVD/HDD control module buffers write data to nonvolatile memory of the HDD assembly during write operations. The write data buffer is located in a hidden portion of the nonvolatile memory of the HDD assembly. The DVD/HDD control module dynamically adjusts a size of the write data buffer in the nonvolatile memory of the HDD assembly. The DVD/HDD control module stores data including copy protection data from a DVD medium in nonvolatile memory of the HDD assembly. The DVD/HDD control module stores data including copy protection data from a plurality of DVD media in nonvolatile memory of the HDD assembly. The DVD/HDD control module stores DVD write format data in nonvolatile memory of the HDD assembly.

In still other features, when the DVD/HDD control module receives a HDD write request while buffering DVD write data to the HDD, the DVD/HDD control module assigns a higher priority to the DVD write data buffering. When a file is read from the DVD, the DVD/HDD control module buffers the file to the HDD. The DVD/HDD control module reduces power to the DVD after buffering the sequential access file to the HDD. When a file is read from the DVD, the DVD/HDD control module buffers a portion of the file to the HDD. The DVD/HDD control module reduces power to the DVD after buffering the portion of the file to the HDD. The DVD/HDD control module buffers another portion of the file to the HDD prior to completion of reading the portion from the HDD.

A combined digital versatile disk (DVD)/hard disk drive (HDD) system for a DVD and a HDD comprises a DVD read channel that communicates with the DVD. A DVD control module communicates with the DVD read channel. A HDD read channel communicates with the HDD. A HDD control module communicates with the HDD read channel. An interface communicates with the DVD control module and the HDD control module.

In still other features, the DVD control module and the DVD read channel are implemented as a first integrated circuit. The HDD control module and the HDD read channel are implemented as a second integrated circuit. The HDD has a hidden section and a user accessible section. DVD content with copy protection is selectively stored in the hidden section of the HDD. Usage data is also written to the hidden portion of the HDD when the DVD content with copy protection is copied to the hidden section. The HDD control module deletes the DVD content with copy protection from the HDD when the usage data indicates allowable use is over. The usage data specifies a number of allowable uses. The usage data specifies a duration of allowable usage.

A method for providing a combined digital versatile disc (DVD)/hard disk drive (HDD) system that controls a HDD assembly and a DVD assembly comprises controlling operation of the HDD assembly and the DVD assembly using a DVD/HDD control module. Volatile data relating to the operation of the DVD assembly and the HDD assembly is stored in volatile memory that communicates with the DVD/HDD control module. Nonvolatile data relating to the operation of the DVD assembly and the HDD assembly is stored in nonvolatile memory that communicates with the DVD/HDD control module.

In other features, video data stored on at least one of the DVD assembly and/or the HDD assembly is decompressed. Video data for storage on at least one of the DVD assembly and/or the HDD assembly is compressed. Read data is buffered to nonvolatile memory of the HDD assembly during read operations. The read data buffer is located in a hidden portion of the nonvolatile memory of the HDD assembly. A size of the read data buffer in the nonvolatile memory of the HDD assembly is dynamically adjusted. Write data is buffered to nonvolatile memory of the HDD assembly during write operations. The write data buffer is located in a hidden portion of the nonvolatile memory of the HDD assembly. A size of the write data buffer in the nonvolatile memory of the HDD assembly is dynamically adjusted. Data including copy protection data from a DVD medium is stored in nonvolatile memory of the HDD assembly. Data including copy protection data from a plurality of DVD media is stored in nonvolatile memory of the HDD assembly. DVD write format data is stored in nonvolatile memory of the HDD assembly. A higher priority is assigned to DVD write data buffering when the DVD/HDD control module receives a HDD write request while buffering DVD write data to the HDD.

In still other features, the file is buffered to the HDD when a file is read from the DVD. The file is a sequential access file. Power is reduced to the DVD after buffering the file to the HDD. A rotational speed of the DVD is slowed. Rotation of the DVD is stopped. A portion of the file is buffered to the HDD when a file is read from the DVD.

In other features, power is reduced to the DVD after buffering the portion of the file to the HDD. Another portion of the file is buffered to the HDD prior to completion of reading the portion from the HDD.

A method for operating a DVD copying system comprises providing a hard disk drive (HDD) assembly that includes nonvolatile memory and a digital versatile disc (DVD) assembly. DVD content with copy protection is selectively read from a DVD medium. The DVD content with the copy protection is selectively copied to the nonvolatile memory of the HDD assembly using a combined HDD/DVD control module.

In other features, the copy protection includes digital rights management (DRM) data. Data relating to the operation of both the DVD and HDD assemblies is stored in volatile and nonvolatile memory. The DVD content with the copy protection is copied to a hidden portion of the nonvolatile memory in the HDD assembly. DVD content with copy protection from multiple DVD media is copied to the nonvolatile memory of the HDD assembly.

In still other features, playback of the DVD content is allowed N times and then the DVD content is made unavailable. Playback of the DVD content is allowed for a predetermined period. The DVD content is made unavailable after the predetermined period.

A method for providing a combined digital versatile disc (DVD)/hard disk drive (HDD) system that controls a HDD assembly and a DVD assembly comprises integrating an HDD read/write channel module and a DVD read/write channel module in an integrated circuit. Read data from and write data to the HDD assembly is processed using the HDD read/write channel module. Read data from the DVD assembly is processed using the DVD read channel module.

In other features, operation of the HDD assembly and the DVD assembly is controlled using a DVD/HDD control module. Volatile data relating to the operation of the DVD assembly and the HDD assembly is stored in volatile memory. Nonvolatile data relating to the operation of the DVD assembly and the HDD assembly is stored in nonvolatile memory. Video data stored on at least one of the DVD assembly and/or the HDD assembly is decompressed. Video data for storage on at least one of the DVD assembly and/or the HDD assembly is compressed. Read data is buffered to nonvolatile memory of the HDD assembly during read operations. The read data buffer is located in a hidden portion of the nonvolatile memory of the HDD assembly. A size of the read data buffer in the nonvolatile memory of the HDD assembly dynamically adjusted. Write data is buffered to nonvolatile memory of the HDD assembly during write operations. The write data buffer is located in a hidden portion of the nonvolatile memory of the HDD assembly. A size of the write data buffer in the nonvolatile memory of the HDD assembly is dynamically adjusted. Data including copy protection data from a DVD medium is stored in nonvolatile memory of the HDD assembly. Data including copy protection data from a plurality of DVD media is stored in nonvolatile memory of the HDD assembly. DVD write format data is stored in nonvolatile memory of the HDD assembly. A higher priority is assigned to the DVD write data buffering when the DVD/HDD control module receives a HDD write request while buffering DVD write data to the HDD. The file is buffered to the HDD when a file is read from the DVD. Power to the DVD is reduced after buffering the file to the HDD. A portion of the file to is buffered the HDD when a file is read from the DVD. Power is reduced to the DVD after buffering the portion of the file to the HDD. Another portion of the file is buffered to the HDD prior to completion of reading the portion from the HDD.

A method for providing a combined digital versatile disk (DVD)/hard disk drive (HDD) system for a DVD and a HDD comprises providing a DVD read channel communicates with the DVD and a DVD control module communicates with the DVD read channel. A HDD read channel communicates with the HDD and a HDD control module communicates with the HDD read channel. An interface communicates with the DVD control module and the HDD control module.

In other features, the DVD control module and the DVD read channel are implemented as a first integrated circuit. The HDD control module and the HDD read channel are implemented as a second integrated circuit. A hidden section and a user accessible section are provided on the HDD. DVD content with copy protection is selectively stored in the hidden section of the HDD. Usage data is written to the hidden portion of the HDD when the DVD content with copy protection is copied to the hidden section. The DVD content with copy protection from the HDD when the usage data indicates allowable use is over. The usage data specifies a number of allowable uses. The usage data specifies a duration of allowable usage.

A combined digital versatile disc (DVD)/hard disk drive (HDD) system that controls a HDD assembly and a DVD assembly comprises DVD/HDD control means that controls operation of the HDD assembly and the DVD assembly. Volatile storing means communicates with the DVD/HDD control means and stores volatile data relating to the operation of the DVD assembly and the HDD assembly. Nonvolatile storing means communicates with the DVD/HDD control means and stores nonvolatile data relating to the operation of the DVD assembly and the HDD assembly.

In other features, video decompression means communicates with the DVD/HDD control means and decompresses video data stored on at least one of the DVD assembly and/or the HDD assembly. Video compression means communicates with the DVD/HDD control means and compresses video data for storage on at least one of the DVD assembly and/or the HDD assembly.

In other features, spindle driving means communicates with the DVD/HDD control means and controls a spindle motor of the DVD assembly. First driving means communicates with the DVD/HDD control means and adjusts a location of one of an optical read/write device or an optical read only device of the DVD assembly. Spindle driving means communicates with the DVD/HDD control means and controls a spindle motor of the HDD assembly. Second driving means communicates with the DVD/HDD control means and controls a read/write arm of the HDD assembly.

In still other features, read/write channel means communicates with the DVD/HDD control means and processes read data from and write data to the HDD and DVD assemblies. Interface means communicates with the DVD/HDD control means and a host interface. The DVD/HDD control means buffers read data to nonvolatile storing means of the HDD assembly during read operations. The read data buffer is located in a hidden portion of the nonvolatile storing means of the HDD assembly. The DVD/HDD control means dynamically adjusts a size of the read data buffer in the nonvolatile storing means of the HDD assembly.

In other features, the DVD/HDD control means buffers write data to nonvolatile storing means of the HDD assembly during write operations. The write data buffer is located in a hidden portion of the nonvolatile storing means of the HDD assembly. The DVD/HDD control means dynamically adjusts a size of the write data buffer in the nonvolatile storing means of the HDD assembly. The DVD/HDD control means stores data including copy protection data from a DVD medium in nonvolatile storing means of the HDD assembly. The DVD/HDD control means stores data including copy protection data from a plurality of DVD media in nonvolatile storing means of the HDD assembly.

In other features, the DVD/HDD control means stores DVD write format data in nonvolatile storing means of the HDD assembly. A system comprises the combined DVD/HDD system and further comprises the HDD assembly and the DVD assembly. The DVD/HDD control means is implemented as an integrated circuit. The volatile storing means includes SDRAM. The nonvolatile storing means includes flash storing means. When the DVD/HDD control means receives a HDD write request while buffering DVD write data to the HDD, the DVD/HDD control means assigns a higher priority to DVD write data buffering. When a file is read from the DVD, the DVD/HDD control means buffers the sequential access file to the HDD. The DVD/HDD control means reduces power to the DVD after buffering the file to the HDD. The DVD/HDD control means slows a rotational speed of the DVD. The DVD/HDD control means stops rotation of the DVD. When a file is read from the DVD, the DVD/HDD control means buffers a portion of the file to the HDD.

In other features, the DVD/HDD control means reduces power to the DVD after buffering the portion of the file to the HDD. The DVD/HDD control means buffers another portion of the file to the HDD prior to completion of reading the portion from the HDD. The DVD/HDD control means slows a rotational speed of the DVD. The DVD/HDD control means stops rotation of the DVD.

A DVD copying system comprises a hard disk drive (HDD) assembly that includes nonvolatile storing means for storing nonvolatile data. A digital versatile disc (DVD) assembly selectively reads DVD content with copy protection from a DVD medium. A combined HDD/DVD control means communicates with the HDD assembly and the DVD assembly and selectively copies the DVD content with the copy protection to the nonvolatile storing means of the HDD assembly.

In other features, the copy protection includes digital rights management (DRM) data. Volatile and nonvolatile storing means stores data relating to the operation of both the DVD and HDD assemblies. The combined HDD/DVD control means is implemented as an integrated circuit. The DVD content with the copy protection are copied to a hidden portion of the nonvolatile storing means in the HDD assembly.

A virtual DVD carousel comprises the DVD copying system wherein DVD content with copy protection from multiple DVD media is stored in the nonvolatile storing means of the HDD assembly.

In other features, the combined DVD/HDD control means allows playback of the DVD content N times and then makes the DVD content unavailable. The DVD/HDD control means deletes the DVD content from the HDD. The combined DVD/HDD control means allows playback of the DVD content for a predetermined period and then makes the DVD content unavailable. The DVD/HDD control means deletes the DVD content from the HDD.

An integrated circuit for a combined digital versatile disc (DVD)/hard disk drive (HDD) system that controls a HDD assembly and a DVD assembly comprises a HDD read/write channel means that communicates with the HDD assembly and that processes read data from and write data to the HDD assembly. A DVD read channel means communicates with the DVD assembly and processes read data from the DVD assembly.

In other features, a system comprises the integrated circuit and further comprises the HDD assembly and the DVD assembly. A DVD/HDD control means communicates with the HDD read/write channel means and the DVD read channel means and controls operation of the HDD assembly and the DVD assembly. Volatile storing means communicates with the DVD/HDD control means and stores volatile data relating to the operation of the DVD assembly and the HDD assembly. Nonvolatile storing means communicates with the DVD/HDD control means and stores nonvolatile data relating to the operation of the DVD assembly and the HDD assembly.

In other features, video decompression means communicates with the DVD/HDD control means and decompresses video data stored on at least one of the DVD assembly and/or the HDD assembly. Video compression means communicates with the DVD/HDD control means and compresses video data for storage on at least one of the DVD assembly and/or the HDD assembly. The DVD read channel means also processes write data to the DVD assembly.

In other features, spindle driving means communicates with the DVD/HDD control means and controls a spindle motor of the DVD assembly. First driving means communicates with the DVD/HDD control means and adjusts a location of one of an optical read/write device or an optical read only device of the DVD assembly. Spindle driving means communicates with the DVD/HDD control means and controls a spindle motor of the HDD assembly. Second driving means communicates with the DVD/HDD control means and controls a read/write arm of the HDD assembly.

In other features, the DVD/HDD control means buffers read data to nonvolatile storing means of the HDD assembly during read operations. The read data buffer is located in a hidden portion of the nonvolatile storing means of the HDD assembly. The DVD/HDD control means dynamically adjusts a size of the read data buffer in the nonvolatile storing means of the HDD assembly. The DVD/HDD control means buffers write data to nonvolatile storing means of the HDD assembly during write operations. The write data buffer is located in a hidden portion of the nonvolatile storing means of the HDD assembly. The DVD/HDD control means dynamically adjusts a size of the write data buffer in the nonvolatile storing means of the HDD assembly. The DVD/HDD control means stores data including copy protection data from a DVD medium in nonvolatile storing means of the HDD assembly. The DVD/HDD control means stores data including copy protection data from a plurality of DVD media in nonvolatile storing means of the HDD assembly. The DVD/HDD control means stores DVD write format data in nonvolatile storing means of the HDD assembly.

In still other features, when the DVD/HDD control means receives a HDD write request while buffering DVD write data to the HDD, the DVD/HDD control means assigns a higher priority to the DVD write data buffering. When a file is read from the DVD, the DVD/HDD control means buffers the file to the HDD. The DVD/HDD control means reduces power to the DVD after buffering the sequential access file to the HDD. When a file is read from the DVD, the DVD/HDD control means buffers a portion of the file to the HDD. The DVD/HDD control means reduces power to the DVD after buffering the portion of the file to the HDD and wherein the DVD/

HDD control means buffers another portion of the file to the HDD prior to completion of reading the portion from the HDD.

A combined digital versatile disk (DVD)/hard disk drive (HDD) system for a DVD and a HDD comprises a DVD read channel means reads data from the DVD. A DVD control means controls the DVD read channel means. A HDD read channel means reads data from the HDD. A HDD control means controls the HDD read channel means. An interface means communicates with the DVD control means and the HDD control means.

In still other features, the DVD control means and the DVD read channel means are implemented as a first integrated circuit. The HDD control means and the HDD read channel means are implemented as a second integrated circuit. The HDD has a hidden section and a user accessible section. DVD content with copy protection is selectively stored in the hidden section of the HDD. Usage data is also written to the hidden portion of the HDD when the DVD content with copy protection is copied to the hidden section. The HDD control means makes the DVD content with copy protection unavailable on the HDD when the usage data indicates allowable use is over. The usage data specifies a number of allowable uses. The usage data specifies a duration of allowable usage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
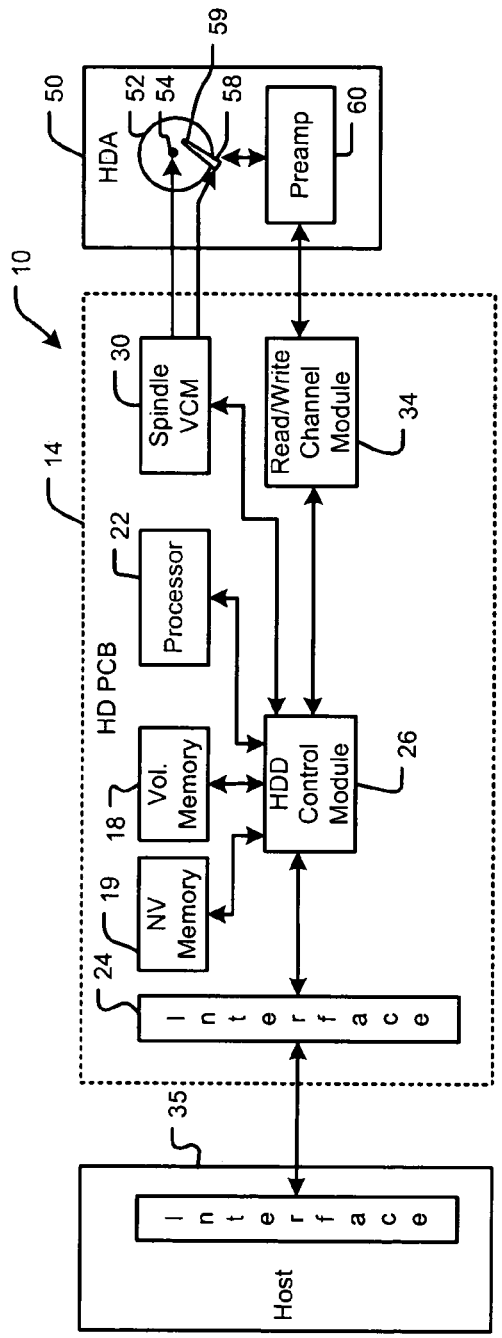
FIG. 1 is a functional block diagram of a Hard Disk Drive (HDD) system according to the prior art.
Figure 2:
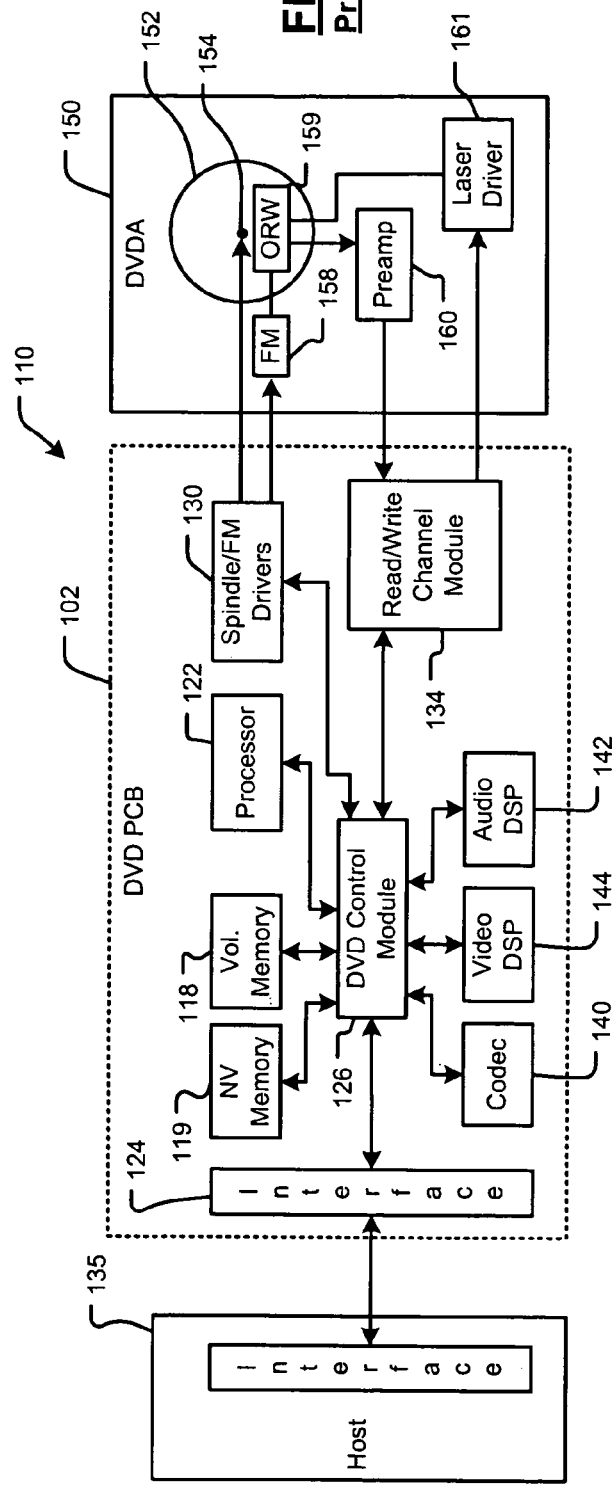
FIG. 2 is a functional block diagram of a digital versatile disc (DVD) system according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

A unified DVD/HDD system controls both DVD and HDD systems. The DVD/HDD system reduces overall system cost and provides improved functionality and performance. Cost is reduced through the use of a single DRAM and flash memory for both the DVD and HDD data storage. A single power supply and a reduced number of external connections are required, which further reduces cost.

In addition, the unified DVD/HDD system allows copy protected content to be copied bit-by-bit to directly to the HDD. In other words, the copy protected content can be copied without decrypting the copy protection scheme or digital rights management (DRM) and without requiring significant operating system involvement. In other words, conventional separate DVD and HDD systems require the DVD to decode/decrypt the DRM or other copy protection prior to output. The DRM or other copy protection may or may not allow subsequent copying to the HDD. By combining the systems, the present invention enables additional functionality with the built-in security of the copy protection or DRM scheme since the DRM or copy protection remains intact. For example, single DVD drive copy operations are supported without removal of the copy protection or DRM. Additionally, the HDD can operate as a virtual DVD changer.

Figure 3:
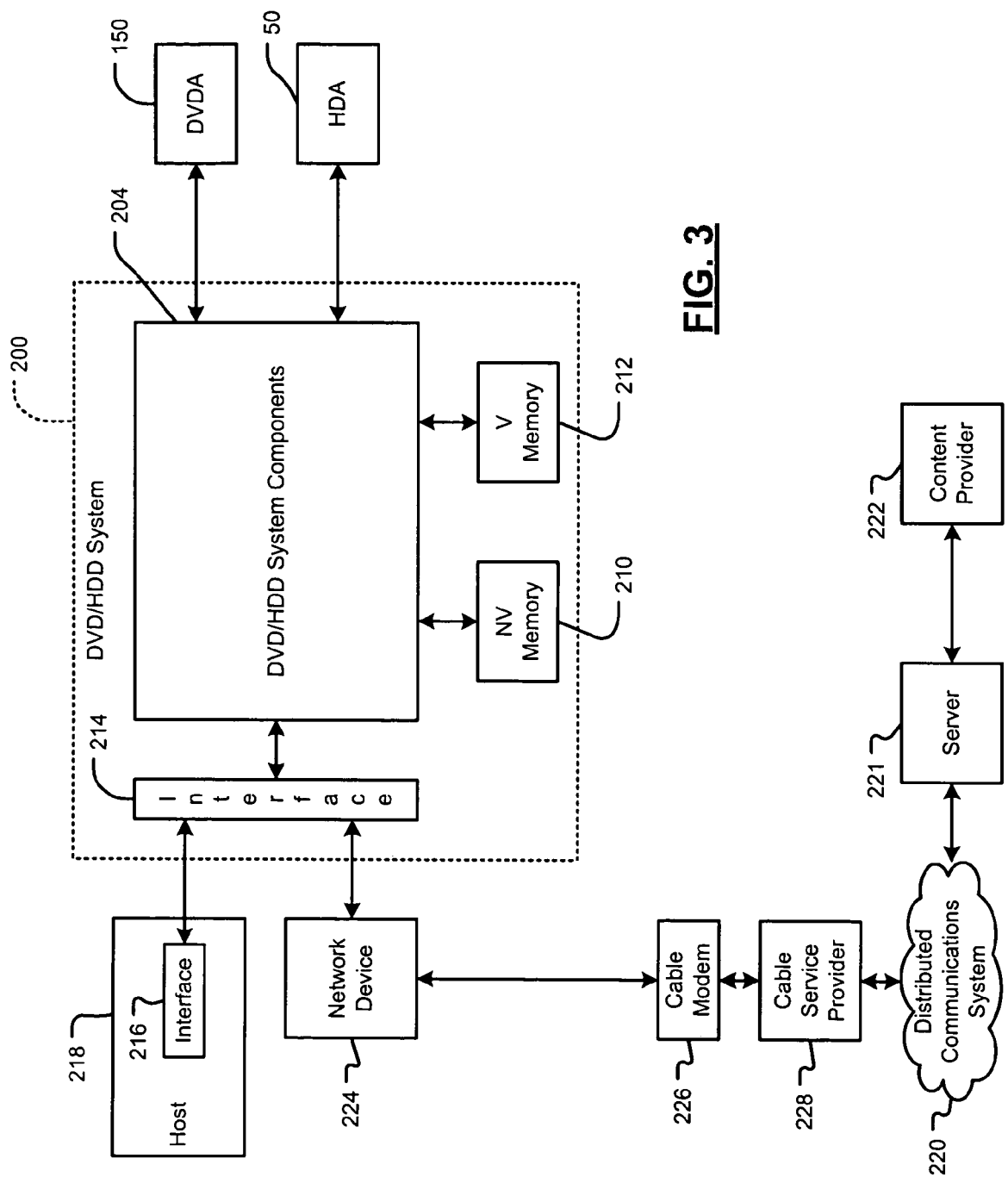
FIG. 3 is a simplified functional block diagram of a combined DVD/HDD system according to some implementations of the present invention.

Referring now to FIG. 3, a simplified functional block diagram of an exemplary combined DVD/HDD system 200 according to some implementations of the present invention is shown. The combined DVD/HDD system 200 includes a combined system control module 204 that communicates with nonvolatile memory 210 and volatile memory 212, which stored data for both DVD and HDD operation. The system control module 204 communicates via an interface 214 with an interface 216 of a host 218. In some implementations, the interfaces 214 and 216 are serial ATA interfaces, Fiber Channels (FC), serial attached small computer system interfaces (SAS), or other suitable interfaces.

In some implementations, the combined DVD/HDD system can be connected to a distributed communications system (DCS) 220, a server 221 and a remote content provider 222. For example, a network device 222 is connected to the interface 214 and to a cable modem 226 to a cable provider 228, which provides a broadband connection to the DCS 220. When a predetermined number of uses or predetermined usage period expires, the user can connect to the content provider 222 and obtain permission for additional usage. While a cable modem and cable connection are shown, wireless connections, wireless stations, access points, routers, DSL modems, DSL providers, telephone modems and cords, and/or other suitable network devices may be used to provide access the DCS 220. In some implementations, the cable service provider 228 can also act as the content provider 222. While not shown, skilled artisans will appreciate that other embodiments shown below may also be connected to a remote content provider in a similar manner. By allowing remote refreshing of the usage data, a user can rent video or other content from a video renting store and return the original content to the store. If the user wants to view the content again after the usage period expires the number of uses are exceeded, the user does not need to go to the renting store, pick up the content, and reload the content. Rather, the user needs to remotely request additional usage.

Figure 4A:
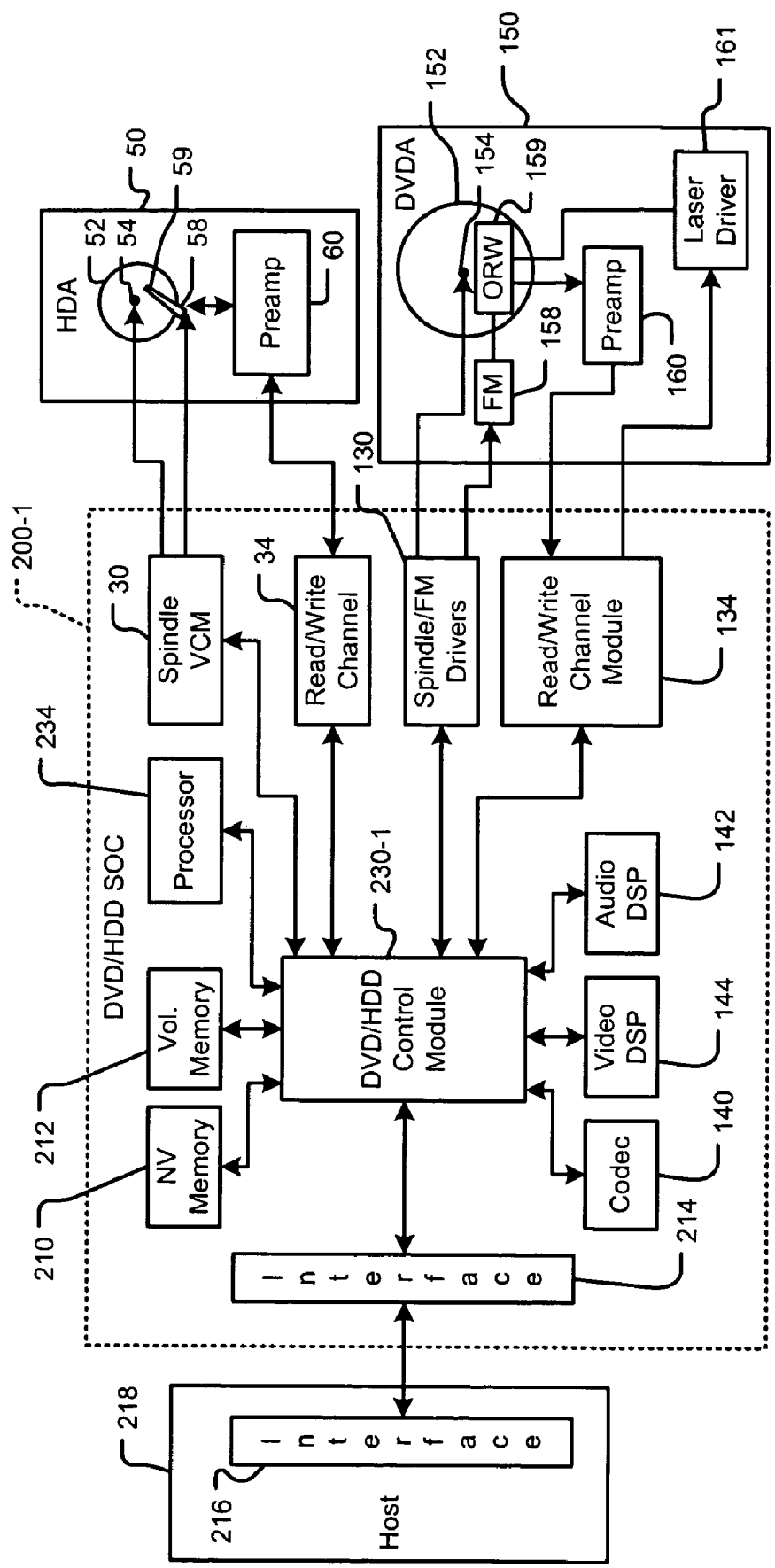
FIG. 4A is a functional block diagram of a combined DVD/HDD system with DVD read/write capability according to other implementations of the present invention.
Figure 4B:
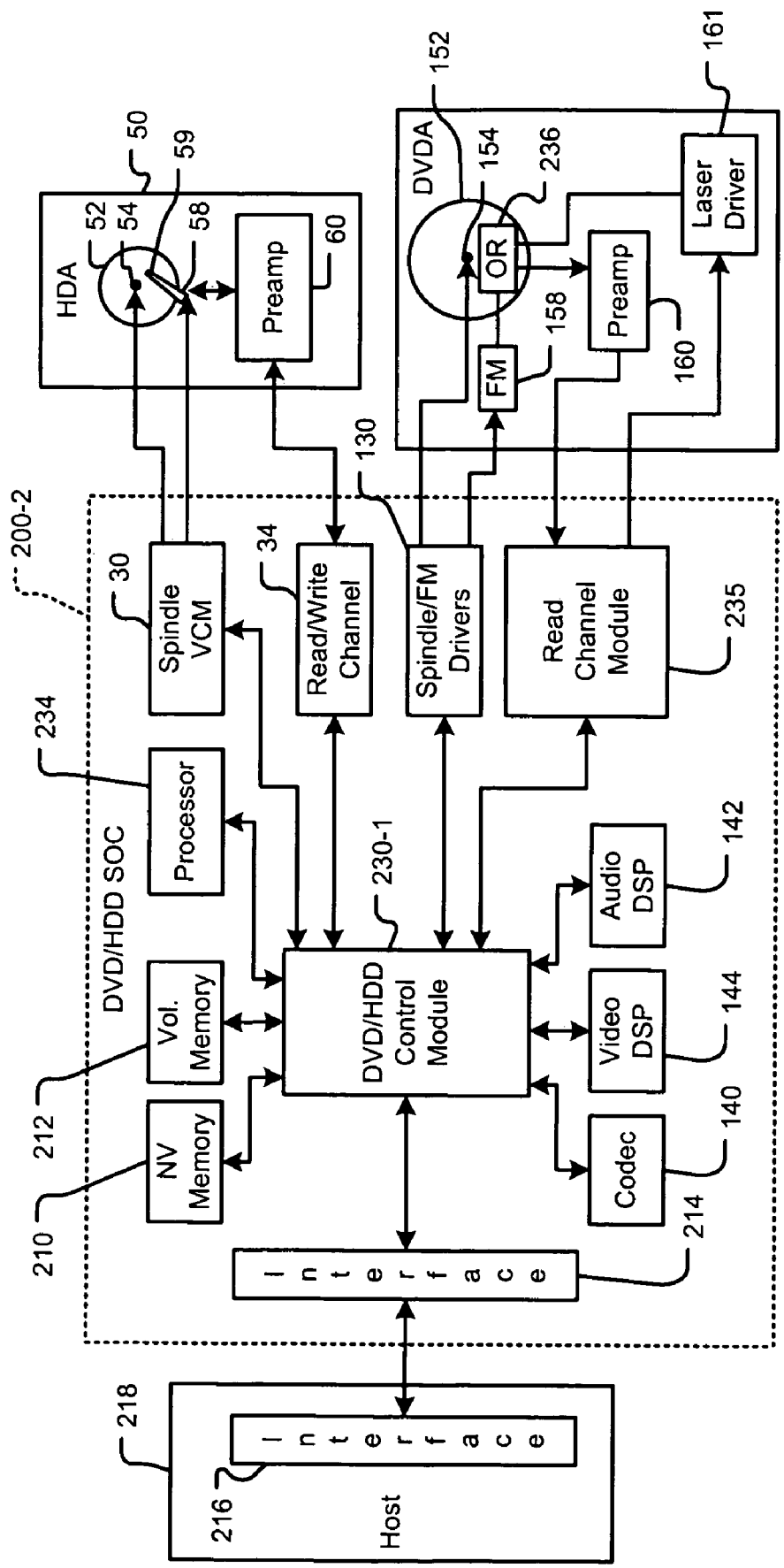
FIG. 4B is a functional block diagram of a combined DVD/HDD system with DVD read only capability according to other implementations of the present invention.
Figure 4C:
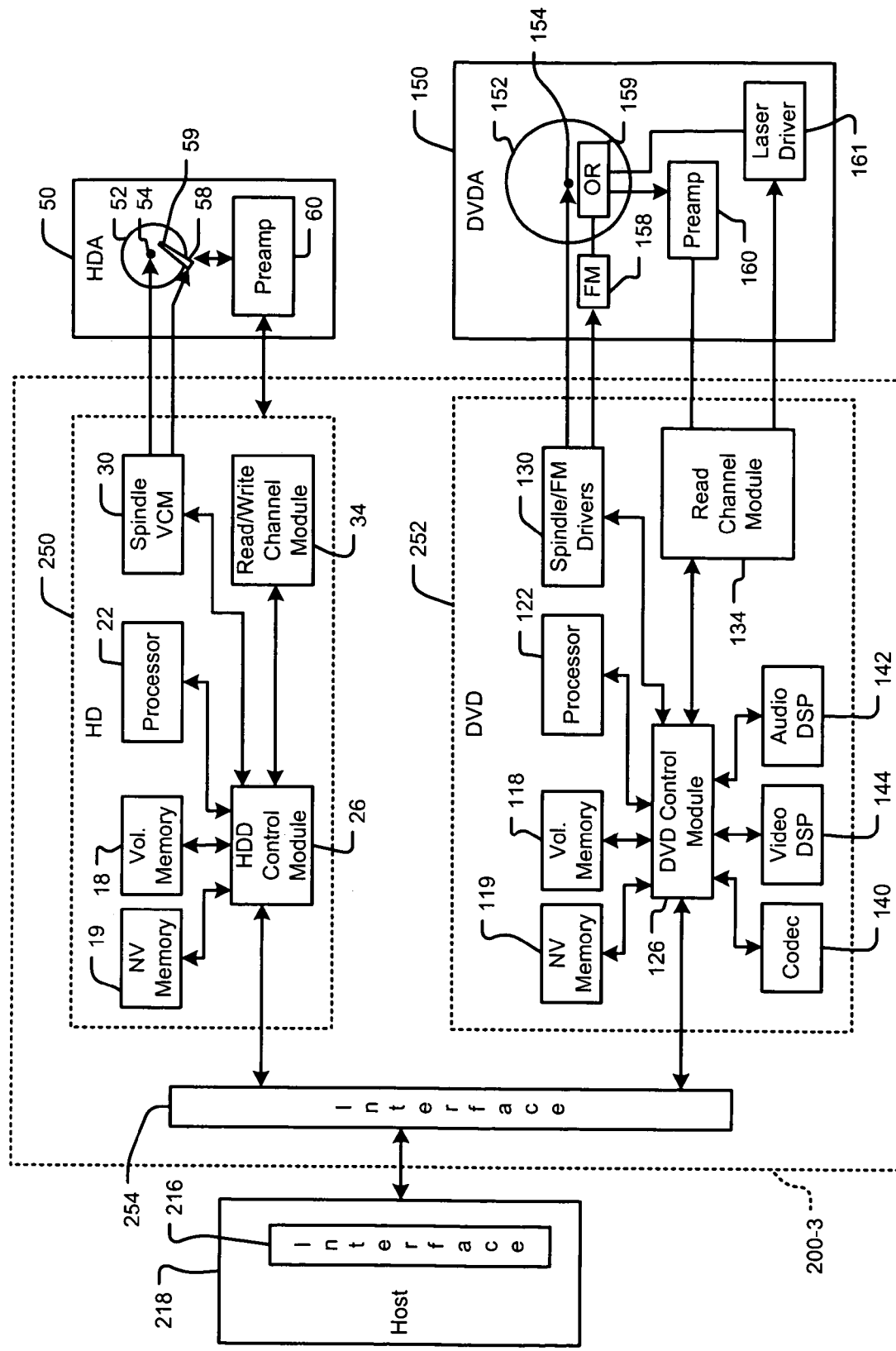
FIG. 4C is a functional block diagram of a DVD/HDD system with a common interface and with DVD read only capability according to other implementations of the present invention.

Referring now to FIGS. 4A, 4B and 4C, more detailed functional block diagrams of exemplary combined DVD/HDD systems 200-1, 200-2 and 200-3, respectively, according to some implementations of the present invention are shown. In FIG. 4A, the DVD/HDD system 200-1 includes a DVD/HDD control module 230-1 that communicates with the nonvolatile memory 210 and the volatile memory 212. A combined processor 234 communicates with the DVD/HDD control module 230-1 and performs data and control processing.

The DVD/HDD control module 230-1 can be implemented as shown or can be implemented by separate DVD and HDD control modules. While separate read/write channel modules 34 and 134 are shown, a single read/write channel module performing HDD and DVD read/write operations can be used. In addition, while separate spindle/VCM and spindle/FM drivers 30 and 130, respectively, are shown, an integrated spindle/VCM/FM driver can also be used.

In the implementation in FIG. 4A, the DVD has DVD read/write capability. In other words, the read/write channel module 134, the laser driver 161, the preamp 160 and the optical read/write device 159 support DVD read/write operation. In FIG. 4B, however, the combined DVD/HDD system 200-2 includes a read channel module 235, the laser driver 161, the preamp 160 and an optical read (OR) device 236 that supports DVD read only operation.

In FIG. 4C, the HDD and DVD systems are implemented as separate integrated circuits 250 and 252 that communicate with the interface 216 of the host 218 via a common interface 254. While FIG. 4C shows a DVD read-only implementation, a DVD read-write implementation with a read/write channel module 134 and ORW 159 is also contemplated.

The implementation in FIG. 4C has a common interface 254 and the HDD 50 has a hidden section and a user accessible section. In some implementations, DVD content with copy protection is stored in the hidden section of the HDD. In some implementation, use data such as an expiration date and/or time, number of allowed uses, etc. are also stored in the hidden portion and/or in memory associated with the DVD/HDD and/or HDD control module. When the use data indicates that allowed usage is over, the DVD content on the HDD is automatically deleted.

Figure 5A:
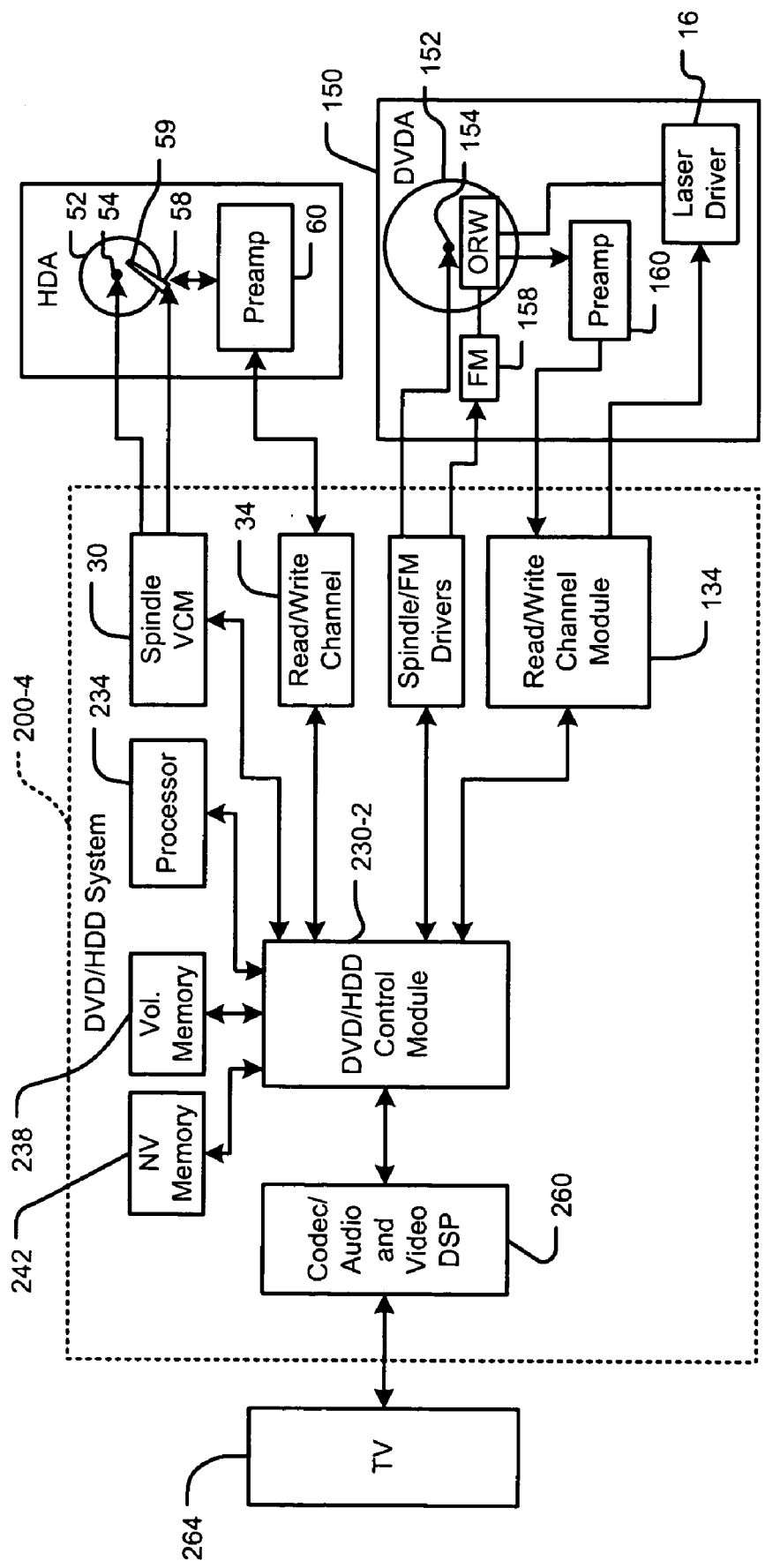
FIG. 5A is a functional block diagram of a combined DVD/HDD system with DVD read/write capability according to other implementations of the present invention.
Figure 5B:
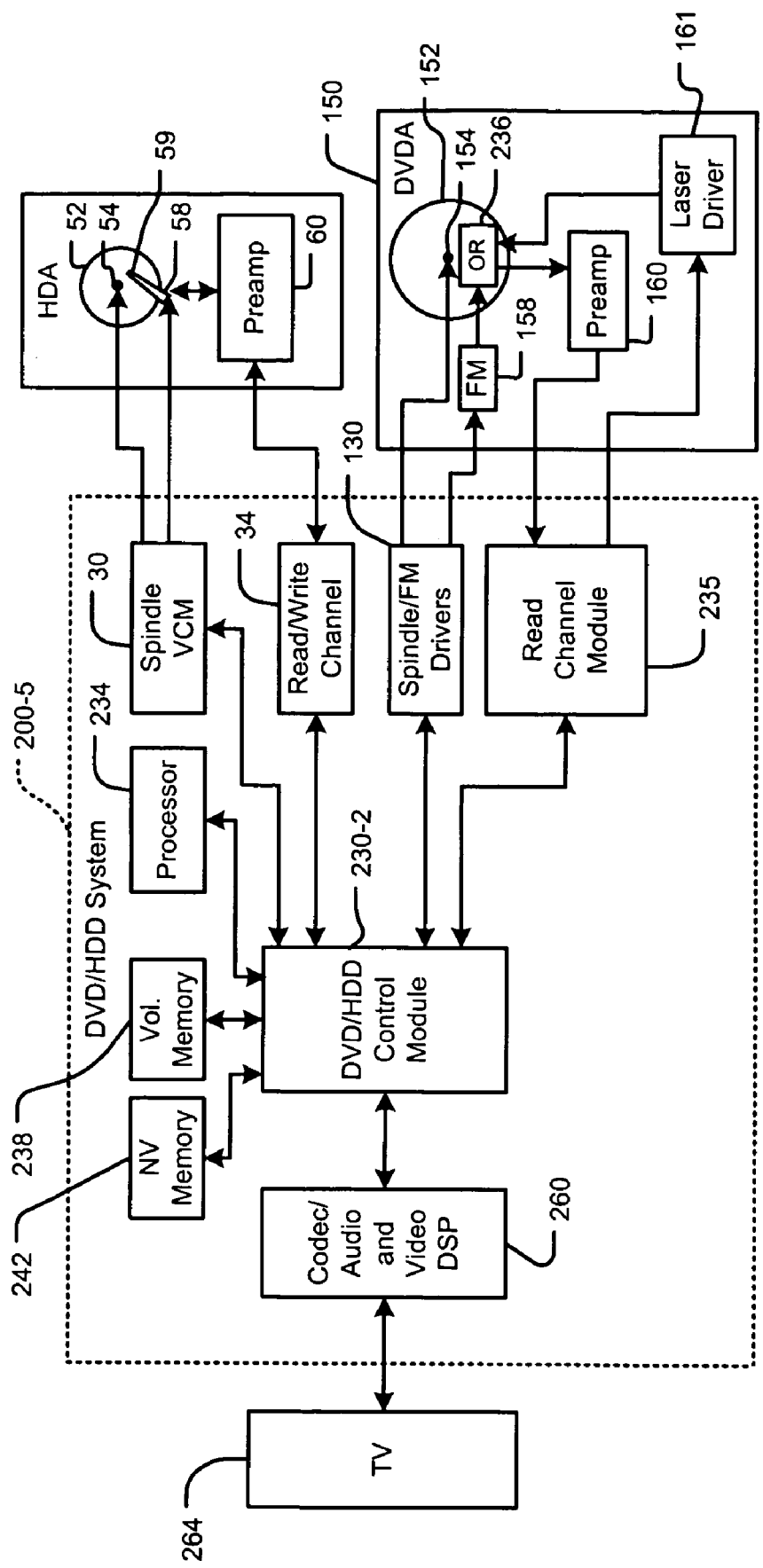
FIG. 5B is a functional block diagram of a combined DVD/HDD system with DVD read only capability according to other implementations of the present invention.
Figure 5C:
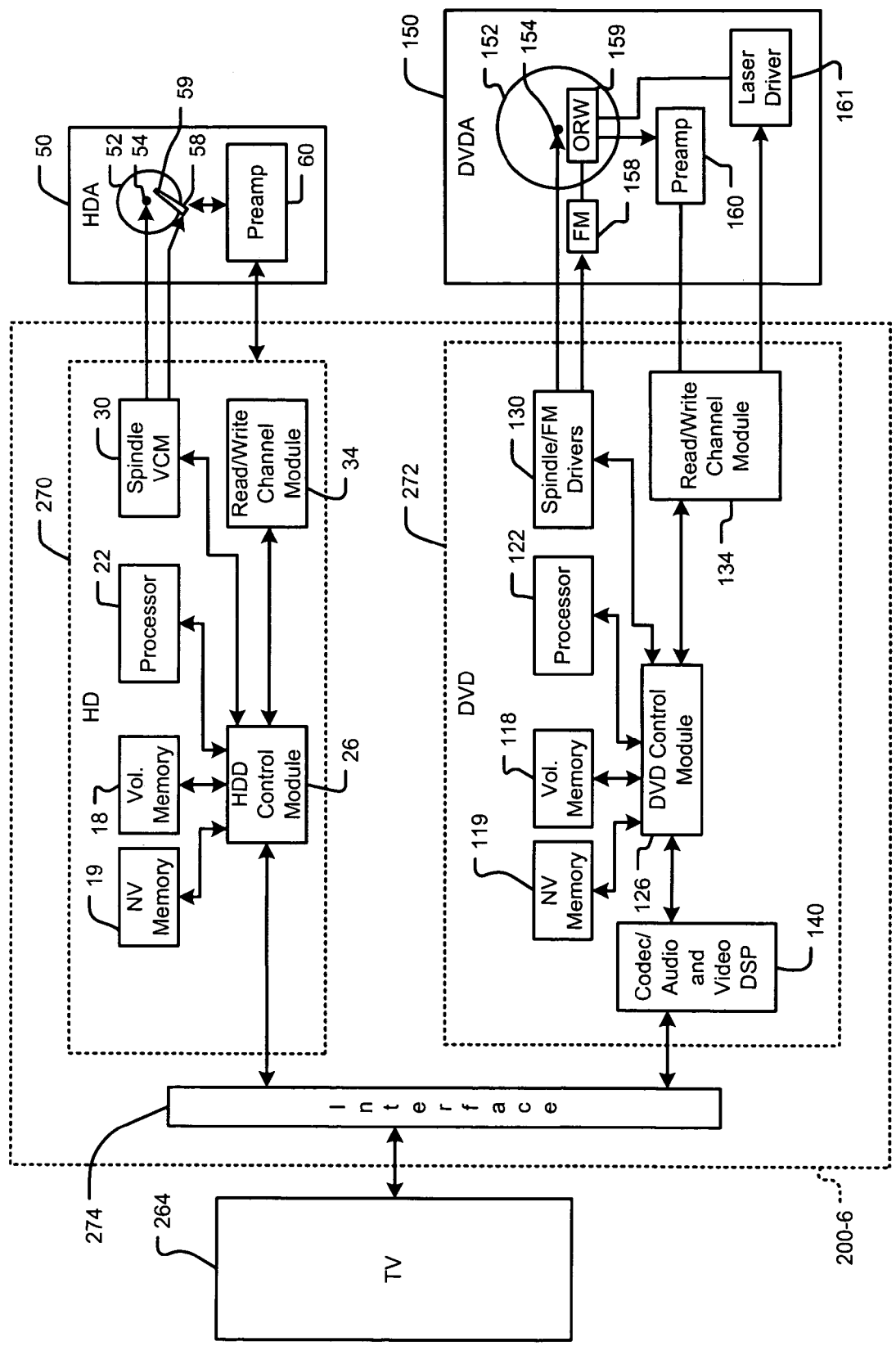
FIG. 5C is a functional block diagram of a DVD/HDD system with a common interface and with DVD read write capability according to other implementations of the present invention.

Referring now to FIGS. 5A, 5B and 5C, functional block diagrams of exemplary combined DVD/HDD systems 200-4, 200-5 and 200-6, respectively, according to other implementations of the present invention are shown. In the implementation shown in FIG. 5A, a signal processor 260 performs MPEG or other similar compression coding and decoding, audio signal processing video signal processing and provides an interface to a television 264. The interface may also perform encoding and/or formatting such as for National Television System Committee (NTSC), Phase Alternating Line (PAL), SCART, and/or other formats.

In the implementation in FIG. 5A, the DVD supports DVD read/write operation. In the implementation in FIG. 5B, however, the DVD supports read only operation. In FIG. 5C, the HDD and DVD systems are implemented as separate integrated circuits 270 and 272 that communicate with the TV 264 via a common interface 274. While FIG. 5C shows a DVD read-write implementation, a DVD read-only implementation is also contemplated. The implementation in FIG. 5C has a common interface and hidden and user accessible HDD sections as described above.

Figure 6:
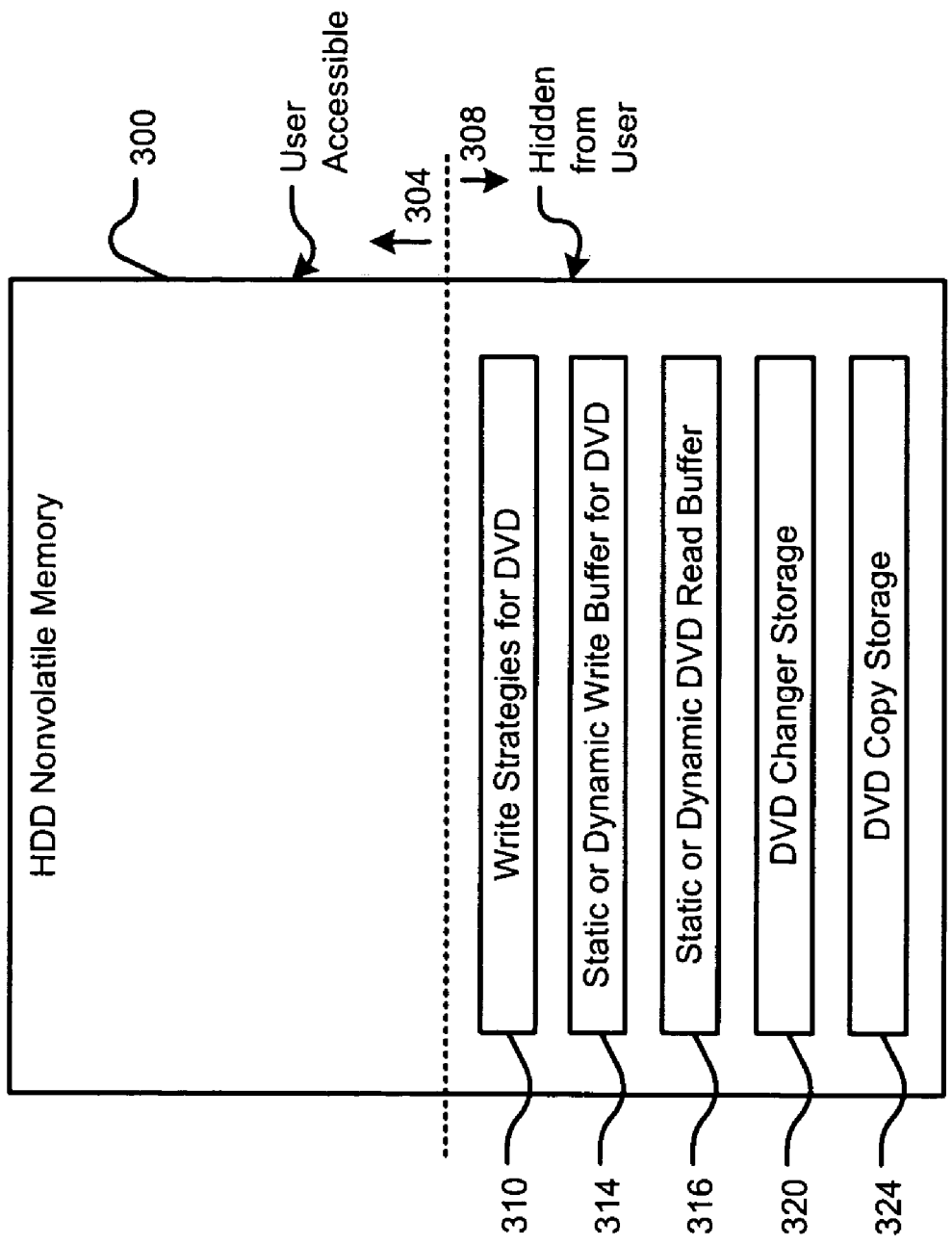
FIG. 6 illustrates partitioning of the nonvolatile HDD memory into user accessible and hidden portions according to some implementations.

Referring now to FIG. 6, partitioning of the nonvolatile memory 300 of the HDD into user accessible and hidden areas according to some implementations is shown. The nonvolatile memory 300 of the HDD is allocated into a first portion 304 that is user accessible and a second portion 308 that is not user accessible (or hidden). The second hidden portion 308 is used in one or more of the following ways according to some implementations of the invention.

For example, data relating to write strategies 310 such as CD−RW, CD+RW, DVD−RW, DVD+RW, and other current or future formats for writing to the DVD are stored in the hidden portion 308. In addition, the hidden portion 308 is used to provide a static or dynamic write buffer 314 for supporting DVD write operations. The hidden portion is used to provide a static or dynamic read buffer 316 for supporting DVD read operations. The hidden portion 308 is used to temporarily store the contents of a DVD that is to be copied (including hidden data) without circumventing the copy protection of the DVD. In addition, the hidden portion 308 of the HDD is used to provide a virtual DVD carousel. In other words, multiple DVDs may be copied to the HDD and played back at a later date. Zero, one or more of these features and functions may be incorporated into the combo DVD/HDD system.

Figure 7B:
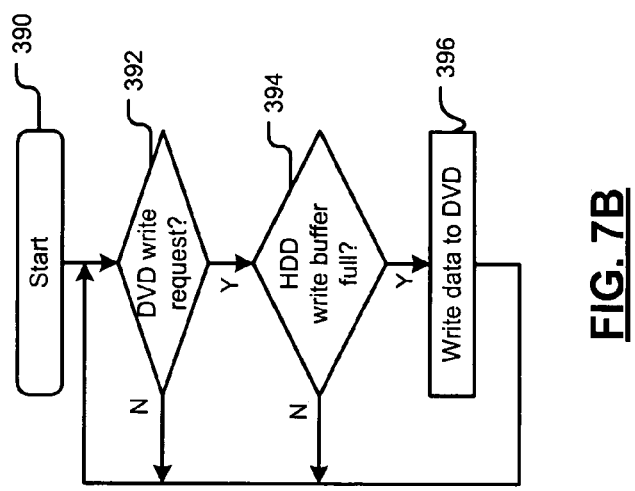
FIG. 7B is a flowchart illustrating the use of the HDD buffer to reduce power consumption of the DVD during write operations.
Figure 7A:
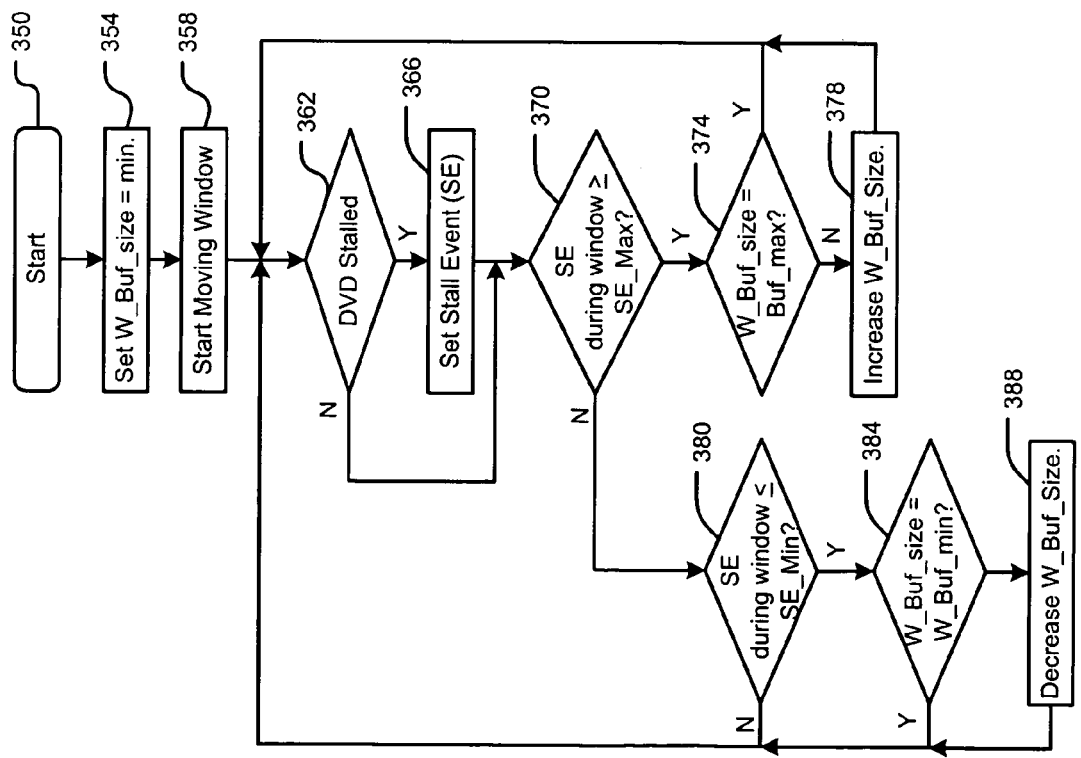
FIG. 7A is a flowchart illustrating steps of a method for dynamically allocating a write buffer in the HDD to support DVD write operations.

Referring now to FIG. 7A, a flowchart illustrating steps of a method for dynamically allocating a write buffer in the HDD to support DVD operations is shown. Control begins with step 350. In step 354, a write buffer size is set equal to a minimum size. In step 358, a moving window is started. In step 362, control determines whether the DVD is stalled. If step 362 is true, control sets a stall event (SE) in step 366.

If step 362 is false or after step 366, control continues with step 370 and determines whether the number of stall events during the moving window is greater than or equal to a maximum threshold. If step 370 is true, control determines whether the write buffer size is equal to a write buffer maximum size in step 374. If step 374 is true, control returns to step 362. If step 374 is false, control increases the write buffer size in step 378 and returns to step 362. If step 370 is false, control determines whether the number of stall events during the moving window are less than or equal to a minimum number of stall events in step 380. If step 380 is false, control returns to step 362. If step 380 is true, control continues with step 384 and determines whether the write buffer size is equal to a minimum write buffer size. If step 384 is true, control returns to step 362. If step 384 is false, control decreases the write buffer size in step 388 and returns to step 362.

The DVD data can also be buffered to both the DRAM (as is traditionally done) and the HDD as a secondary buffer. This is especially important for DVD write operations. Any interruption during the DVD write operation translates into data loss at the DVD disc. By using the HDD as a secondary buffer, the size of the buffer can be increased beyond the size of a low cost DRAM buffer. As a result, the DVD write operation can be performed only when the buffer is filled in the HDD, which will reduce power consumption. The min buffer size can also be adjusted depending on how often the DVD write operation is stalled, thus optimizing latency and lowering write errors.

Referring now to FIG. 7B, steps for using the HDD to buffer write data to the DVD are shown. Control begins in step 390. In step 392, control determines if there is a DVD write request. If step 392 is false, control returns to step 392. If step 392 is true, control determines whether the HDD write buffer is full in step 394. If step 394 is false, control returns to step 392. If step 392 is true, control writes data to the DVD in step 396. As can be appreciated, power consumption is reduced by writing larger blocks of data to the DVD. In other words, the size of the write buffer on the HDD is set larger than the SDRAM buffer that is typically used.

Figure 8:
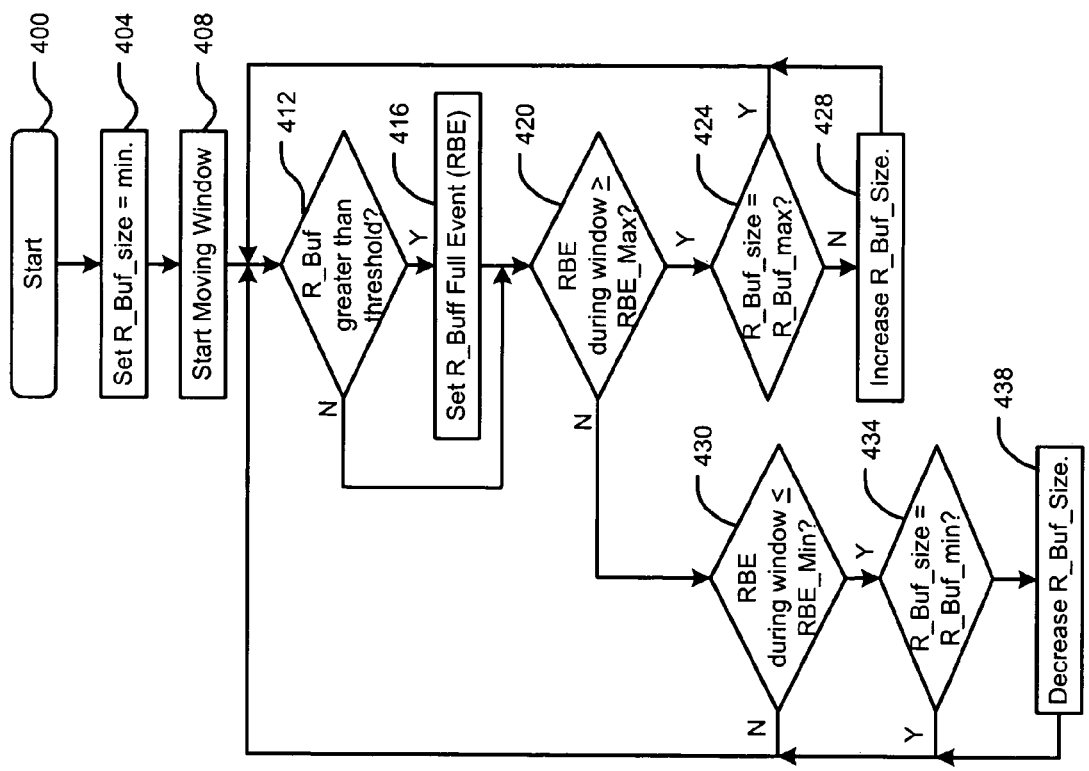
FIG. 8 is a flowchart illustrating steps of a method for dynamically allocating a read buffer in the HDD to support DVD read operations.

Referring now to FIG. 8, a flowchart illustrating steps of a method for dynamically allocating a read buffer in the HDD to support DVD operations is shown. Control begins with step 400. In step 404, a read buffer size is set equal to a minimum read buffer size. In step 408, a moving window is started. In step 412, control determines whether the read buffer is greater than a threshold. For example, the threshold can be set equal to a percentage such as 80%, 90%, etc. of the current read buffer size and/or the threshold can be set equal to a given number of bytes that are less than or equal to the current read buffer size.

If step 412 is true, control sets a read buffer full event (RBE) in step 416. If step 412 is false or after step 416, control continues with step 420 and determines whether the number of read buffer full events during the window is greater than or equal to a maximum threshold. If step 420 is true, control determines whether the read buffer size is equal to a read buffer maximum size in step 424. If step 424 is true, control returns to step 412. If step 424 is false, control increases the read buffer size in step 428 and returns to step 412. If step 420 is false, control determines whether the number of read buffer full events during the window are less than or equal to a minimum number of read buffer full events in step 430. If step 430 is false, control returns to step 412. If step 430 is true, control continues with step 434 and determines whether the read buffer size is equal to a minimum read buffer size. If step 434 is true, control returns to step 412. If step 434 is false, control decreases the read buffer size in step 438 and returns to step 412.

The use of the HDD to buffer read operations (caching DVD read operation) improves overall system performance. Significant read access speed improvements can be attained since the random HDD access time is typically more than an order of magnitude faster than that of DVD. As with the allocation of HDD storage area for the DVD cache read and write operation, the hidden portion on the HDD can be used for this purpose so that the user will not accidentally erase the data. The hidden portion on the HDD can optionally have a dynamic size allocation depending on the size of available free and overall HDD storage capacity.

As can be appreciated by skilled artisans, there are a variety of ways of implementing dynamic read and/or write buffer sizes. Therefore, skilled artisans will appreciate that the exemplary steps shown in FIGS. 7A and 8 are illustrative in nature.

Figure 9:
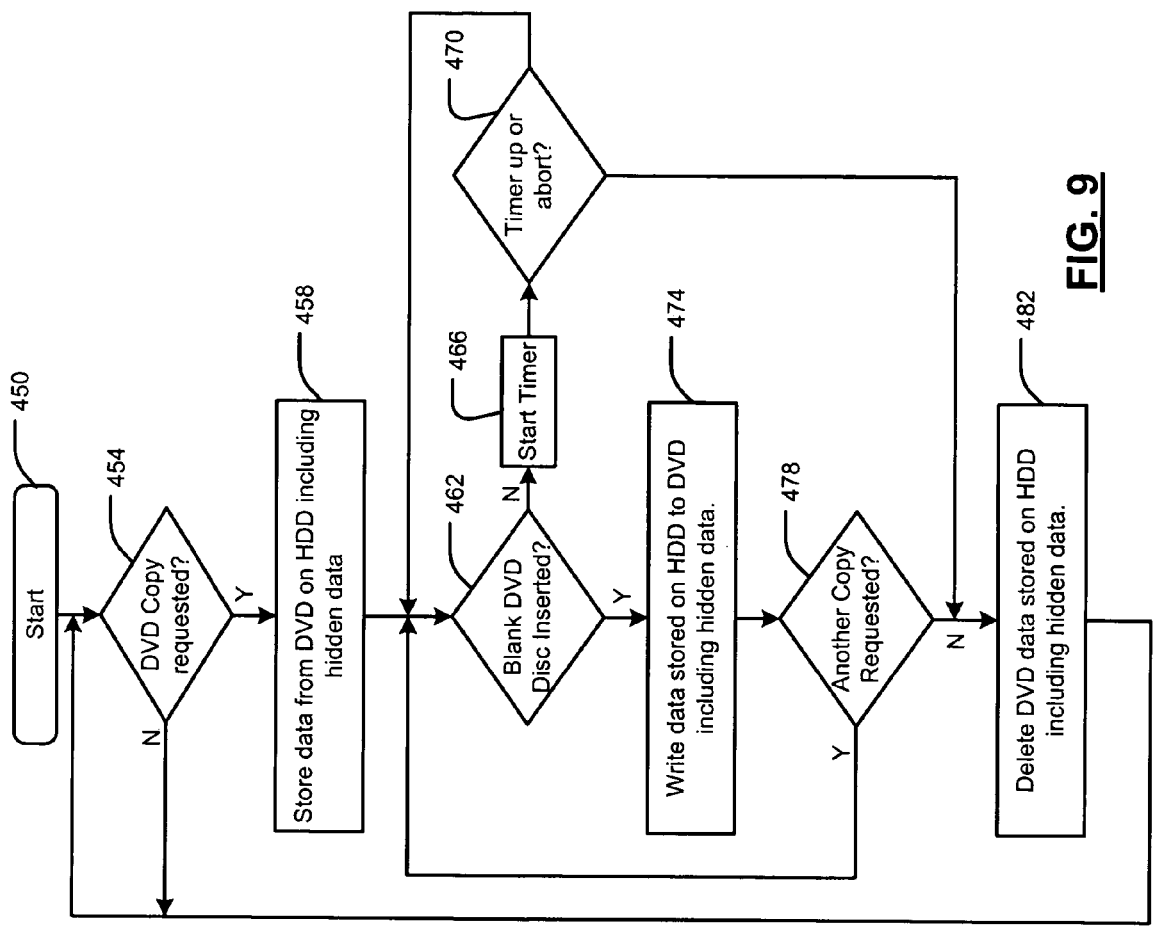
FIG. 9 is a flowchart illustrating steps of a method for copying DVDs using the HDD.

Referring now to FIG. 9, a flowchart illustrating steps of a method for copying DVDs using the HDD is shown. Control begins with step 450. In step 454, control determines whether a DVD copy has been requested. If not, control returns to step 454. If step 454 is true, control-stores data from the DVD on the HDD including hidden data and/or copy protection data such as DRM in step 458. In other words, bit-by-bit copying of the data on the DVD to the HDD occurs. Furthermore, the copying operation can be performed on a bit-by-bit basis with little or no interaction with the operating system.

In step 462, control determines whether a blank DVD has been inserted. If step 462 is false, control optionally starts a timer in step 466. In step 470, control determines whether the user has aborted the copy procedure or the optional timer is up (if used). If step 470 is false, control returns to step 462.

If step 462 is true, control writes data stored on the HDD to the blank DVD including hidden data and/or copy protection data in step 474. In step 478, control determines whether the user would like to make another DVD copy. If step 478 is true, control returns to step 462. If step 478 is false, control deletes the DVD data stored on the HDD in step 482 and returns to step 454. If step 470 is true, control also continues with step 482.

By unifying the control architecture for DVDs and HDDs, only one interface port is needed to interface the combined device to the host system (a PC, home recorder, and/or television for example). This will also reduce the overall system cost and power consumption. The cost reduction is limited to chip and packaging cost reduction, but also includes the cabling and the host chip cost and power saving. Another cost saving is the use of a single PCBA (printed circuit board assembly) with the associated discrete component cost reductions such as a single power supply connector and a single power management control.

The unified architecture takes advantage of the fact that the combined DVD/HDD system has a high capacity permanent and fixed nonvolatile storage (the HDD). In this case, the HDD stores critical DVD parameters such as various write strategies for different DVD-RW disc media. This will further reduce the cost of the overall subsystem since a large capacity flash memory is conventionally used to store the large number of disc media formats that need to be supported.

As the number of suppliers of DVD disc media and DVD disc formats increases over the next several years, this cost saving will increase further. To prevent accidental erasure of this critical DVD data that is stored in the HDD (instead of a flash memory), the dedicated DVD data in the HDD is preferably hidden from the HDD users. This means that as far as the HDD user is concerned, the critical DVD data does not exist in the HDD.

The combined architecture also improves single DVD drive copy operation. This is done by first copying the DVD data bit-by-bit into the HDD with little or no operating system interaction. Because the HDD is under the same control as the DVD device, all of the information can be copied (including hidden and/or copy protection data of the DVD disc such as DRM) onto the HDD without worrying that the information and the data will be copied illegally once it is moved to the HDD. The copy protection and/or DRM are still intact.

Security is provided by locating the HDD area for the temporary copy of the DVD data in the hidden portion of the HDD. The temporary copy can then be written back onto the DVD drive once a new blank DVD disc is inserted. If multiple DVDs are copied to the HDD, the HDD can also be used as virtual DVD changer. The DVD data stored in the HDD is treated as virtual DVD's. When reading the DVD data from the HDD, normal DVD operations such as DVD copy protection can be performed.

By locating code and/or media formats in the DVD instead of flash, the code and/or media formats can be easily updated. In some implementations, the code and/or media are updated remotely, for example over a distributed communications system such as an intranet, the Internet and/or any other WAN or LAN via a host device such as a computer. In contrast, when the code and/or media formats in the flash memory need to be updated, the flash memory must be re-burned, which is inconvenient.

Figure 10:
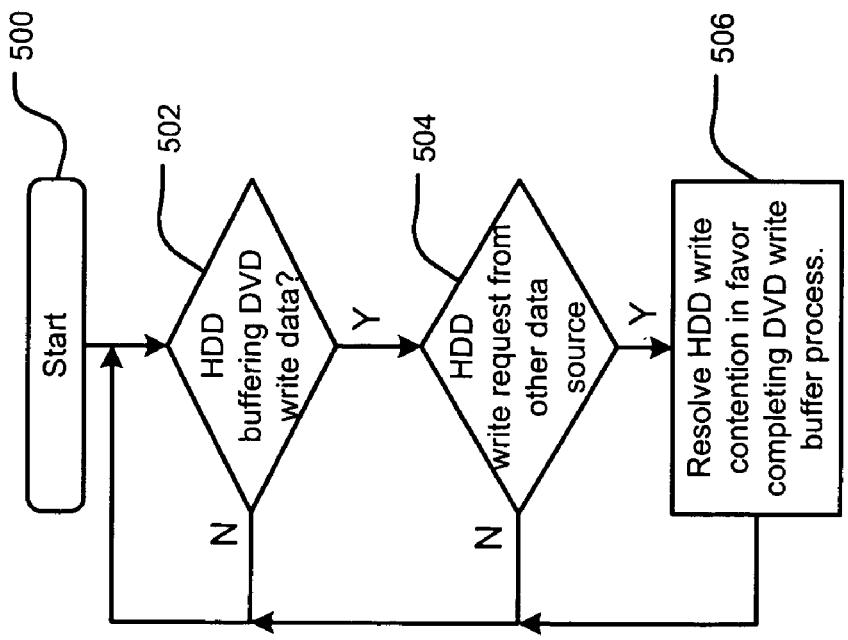
FIG. 10 is a flowchart illustrating steps of a method for buffering DVD write data to the HDD with write buffer priority.

Referring now to FIG. 10, steps of a method for buffering DVD write data to the HDD with write buffer priority are shown. Normally, a small buffer is used, which may slow the DVD write operation and/or cause overflow when the buffer is exceeded. According to some implementations of the invention, the data to be written to the DVD is buffered to the HDD, which prevents overflow. Control begins with step 500. In step 502, control determines whether the HDD is buffering DVD write data. If step 502 is false, control returns to step 502. If step 502 is true, control determines whether there is an HDD write request from another data source other than for the DVD write buffer process. If step 504 is true, control resolves HDD write contention in favor of completing the DVD write buffer process in step 506 and then control returns to step 502. The other HDD write process associated with the other HDD write data can be completed after the DVD write buffer process is finished. This method allows the DVD write buffer process to complete without loss of DVD write data.

Figure 11:
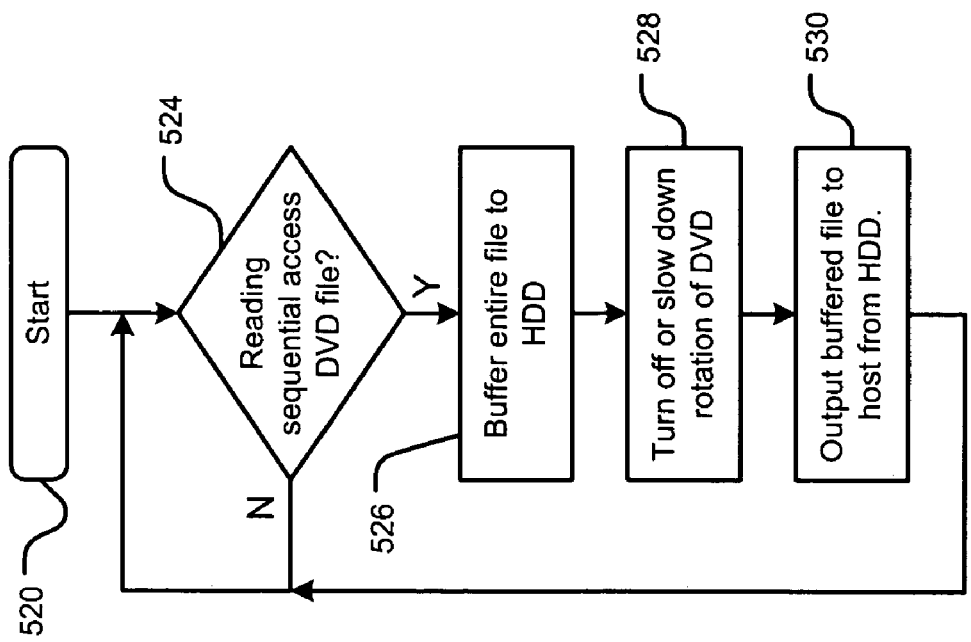
FIG. 11 is a flowchart illustrating steps of a method for reading a sequential access DVD file to the HDD.

Referring now to FIG. 11, steps of a method for reading a sequential access DVD file to the HDD are shown. In other words, the HDD is used as a read buffer for sequential access DVD files. Control begins with step 520. In step 524, control determines whether a read operation of a sequential access DVD file is occurring. If step 524 is false, control returns to step 524. If step 524 is true, control continues with step 526 and buffers the DVD file to the HDD. Control continues with step 528 and turns off or slows down rotation of the DVD after buffering the DVD sequential access file to the HDD. Control continues with step 530 and outputs the buffered file from the HDD to the host. The data output from the HDD can also occur as soon as a sufficient amount of data has been buffered to the HDD instead of waiting for the file to be buffered.

Figure 12:
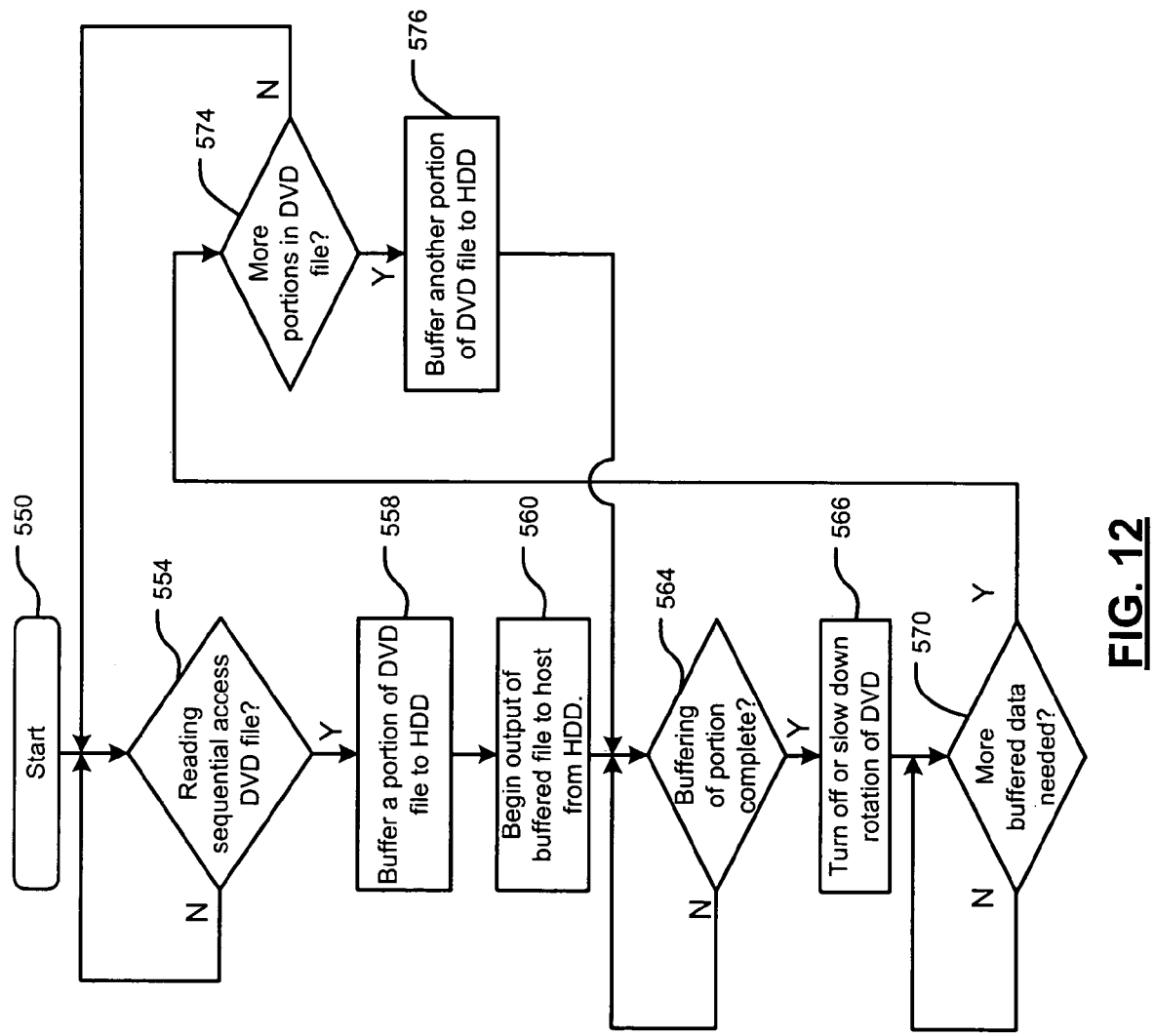
FIG. 12 is a flowchart illustrating steps of a method for reading a sequential access DVD file to the HDD in portions.

Referring now to FIG. 12, steps of a method for reading a sequential access DVD file to the HDD in fixed or variable-sized portions are shown. Control begins with step 550. In step 554, control determines whether it is reading a sequential access DVD file. If step 554 is false, control returns to step 554. If step 554 is true, control continues with step 558 and buffers a portion of the DVD file to the HDD. Readback from the HDD can occur at this time. In step 560, the HDD begins outputting the buffered file to the host. In step 564, control determines whether buffering of the portion on the HDD is complete. If the step 564 is false, control returns to step 564. If step 564 is true, control turns off or slows down rotation of the DVD. In step 570, control determines whether additional buffered data is needed. Additional data will be needed when the data from the stored portion has been read back Additional buffered data is preferably moved to the HDD before the prior portion is exhausted to prevent delay. This determination can be made based upon the read or unread data size as a percentage of the buffered portion stored on HDD, associated read/write delay times and/or other factors.

If additional buffered data is needed as determined in step 570, control determines whether there are additional portions in the sequential DVD file in step 574. If step 574 is false, control returns to step 554. If step 574 is true, control buffers another portion of the DVD file to the HDD in step 576 and control continues with step 564.

Figure 13A:
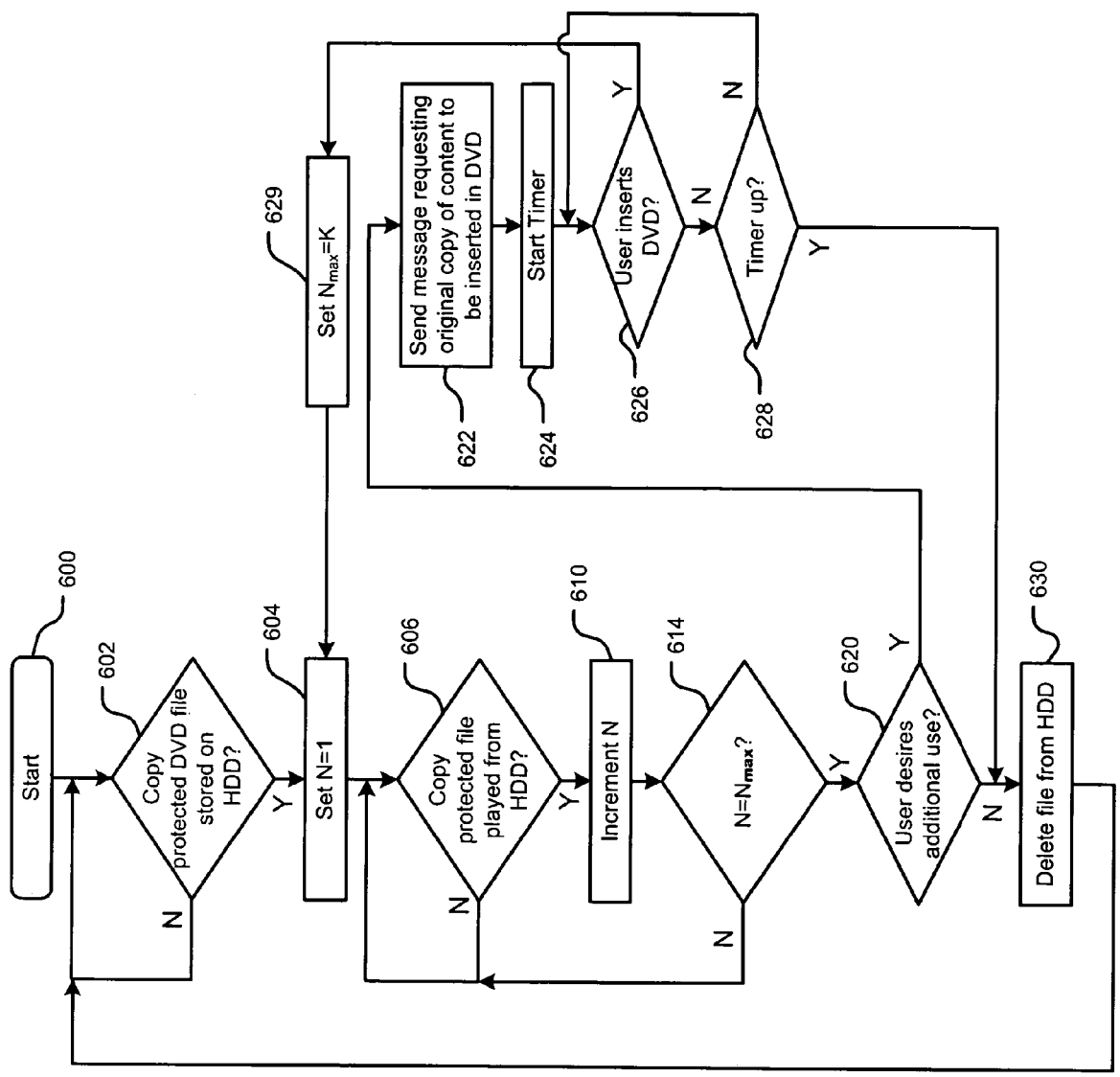
FIGS. 13A and 13B are flowcharts illustrating steps of methods for allowing N playbacks of a copy protected DVD file from the HDD.

Referring now to FIG. 13A, steps of a method for allowing playback of a copy protected file from the HDD N times are shown. Control begins with step 600. In step 602, control determines whether copy protected DVD files have been stored on the HDD. If not, control returns to step 602. It step 602 is true, control sets N=1 for the DVD file in step 604. In step 606, control determines whether the copy protected file stored on HDD has been played from the HDD. If step 606 is false, control returns to step 606. If step 606 is true, control increments N in step 610. In step 614, control determines whether $N=N_{max}$.

If step 614 is false, control returns to step 606. If step 614 is true, control determines whether the user desires additional usage of the content in step 620. If step 620 is true, control sends a message requesting the original DVD containing the content to be inserted in the DVD player in step 622. In step 624, control starts a timer. In step 626, control determines whether the DVD containing the content has been inserted in the DVD player. If not, control determines whether the timer is up in step 628. If step 628 is false, control returns to step 626. If step 626 is true, control optionally sets $N_{max}$ to a new value K (which may be different than or the same as the prior number of uses) in step 629 and returns to step 604. If step 620 is false or step 628 is true, control makes the content unavailable and/or deletes the copy protected file from the HDD in step 630 and control returns to step 602.

By allowing refreshing of the usage data after the allowed number of plays are used, a user can avoid the time required to reload the HDD with the DVD content. In other words, if the user wants to view the content again after the allowed number of plays are used, the user does not need to reload the content onto the HDD. Rather, the user only needs to insert the original DVD content to verify the user's right to the content. As a result, the user saves time.

Figure 13B:
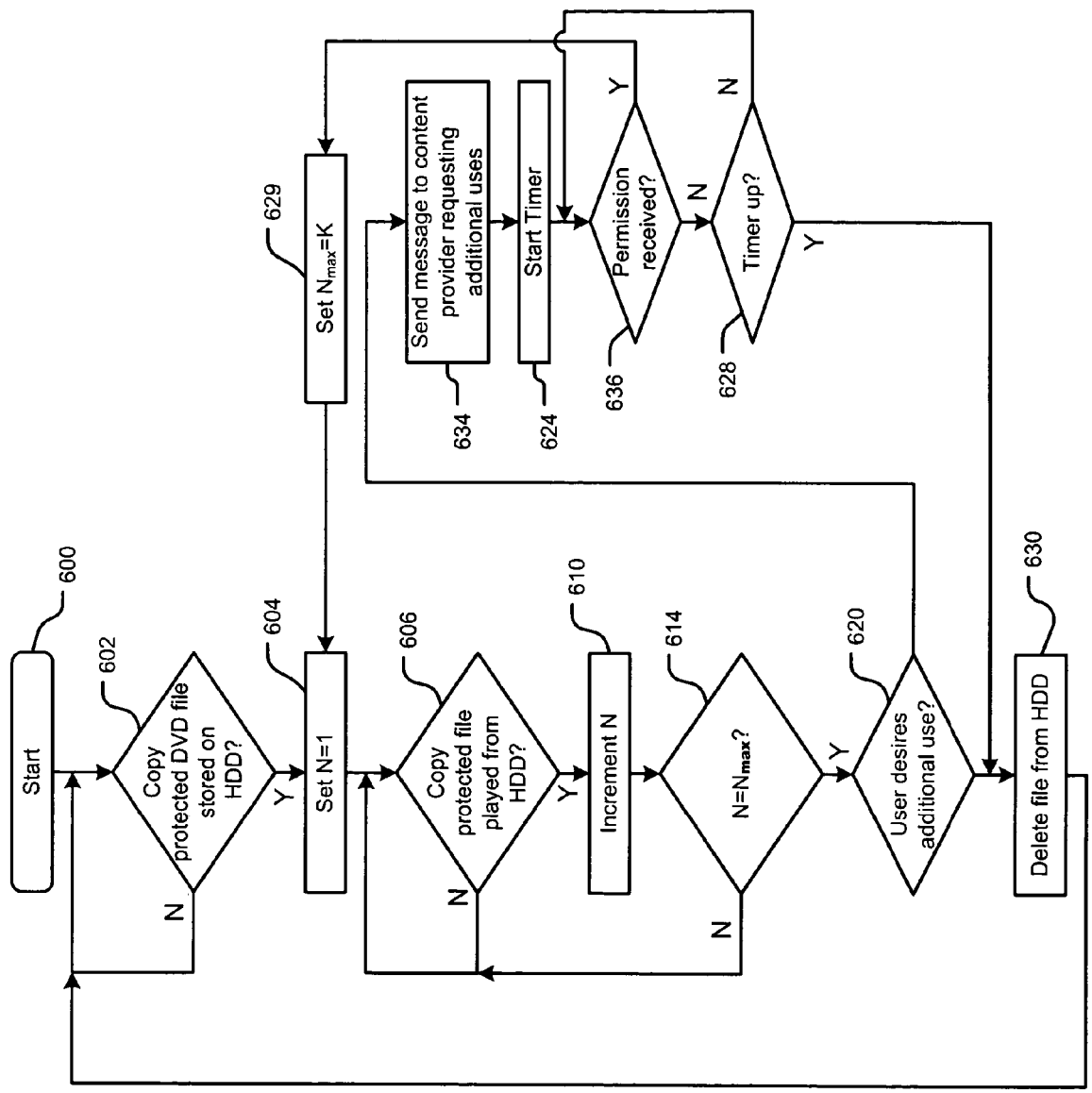

Referring now to FIG. 13B, when the number of uses have been exhausted, the combined DVD/HDD can contact a content provider via a network to request and/or purchase additional uses. Steps 622 and 626 are replaced by steps 634 and 636, respectively. In step 634, the DVD or any other network device such as a computer sends a message to the content provider requesting additional usage. The content provider may initiate a dialog with the user if needed. The message can be generated by the combined DVD/HDD and/or a user can use a laptop or desktop computer or other network capable device to access a web page or other web enabled interface to request additional usage. In step 636, the DVD determines whether additional usage permission has been received. In some implementations, the usage permission is received electronically over the network connection with or without user interaction. In other implementations, the user is given a pass code that can be entered to receive additional usage.

By allowing remote refreshing of the usage data after the allowed number of plays are used, a user can rent video or other content from a video renting store and return the original content to the store. If the user wants to view the content again after the allowed number of plays are used, the user does not need to go to the content renting store, pick up the content, and reload the content. Rather, the user only needs to remotely request additional usage.

Figure 14A:
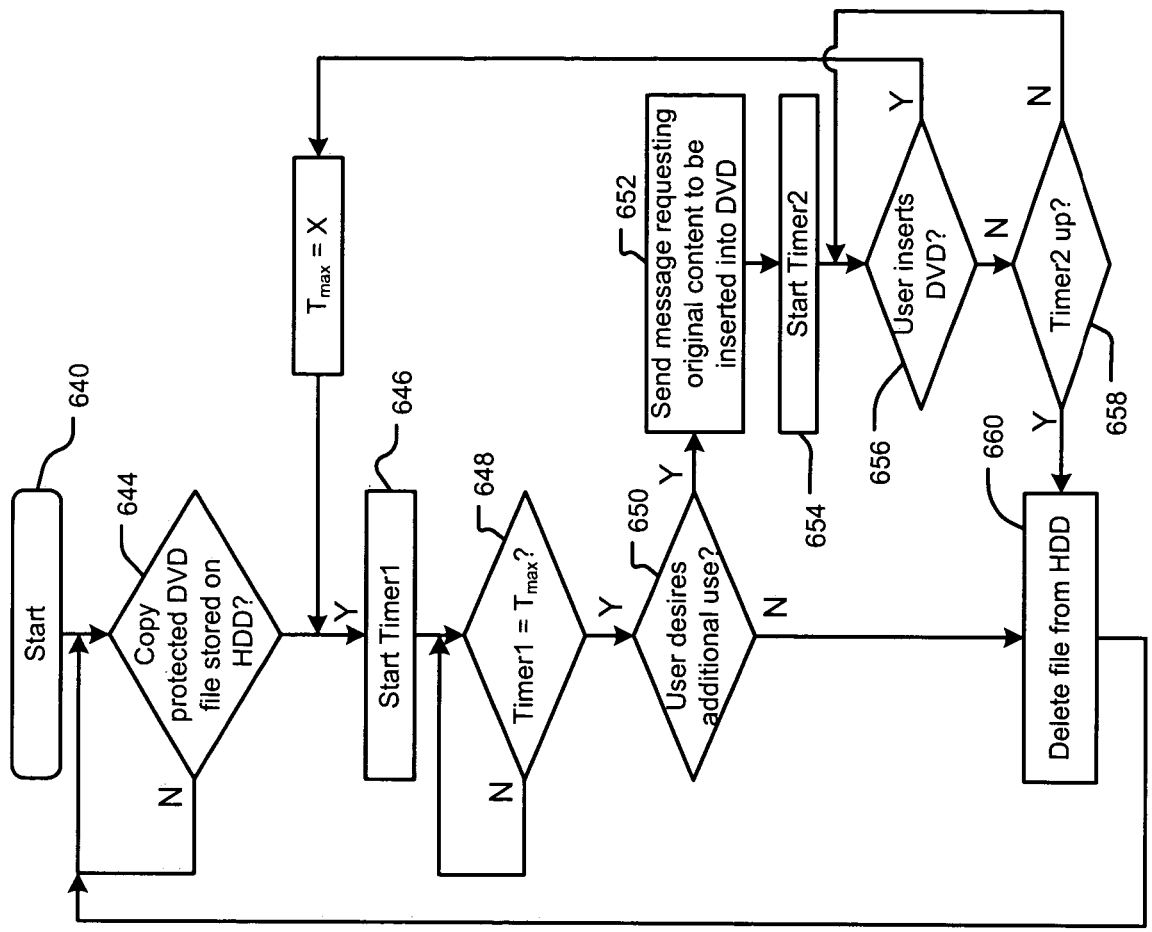
FIGS. 14A and 14B are flowcharts illustrating steps of methods for limiting the amount of time that a copy protected DVD file stored on the HDD can be played.

Referring now to FIG. 14A, steps of a method for limiting the amount of time that a copy protected file stored on the HDD can be played are shown. Control begins with step 640. In step 644, control determines whether the copy protected DVD file has been stored on the HDD. If step 644 is false, control returns to step 644. Otherwise, control continues with step 646 and sets Timer1. In step 648, control determines whether the Timer1=$T_{max}$. If step 648 is false, control returns to step 648. If step 648 is true, control determines whether the user desires additional usage of the content in step 650. If step 650 is true, control sends a message requesting the original DVD containing the content to be inserted in the DVD player in step 652. In step 654, control starts Timer2. In step 656, control determines whether the DVD containing the content has been inserted in the DVD player. If not, control determines whether Timer2 is up in step 658. If step 658 is false, control returns to step 656. If step 656 is true, control optionally sets $T_{max}$ to a new value in step 659 and returns to step 646. If step 650 is false or step 658 is true, control makes the content unavailable and/or deletes the copy protected file from the HDD in step 660 and control returns to step 644. While a timer is described, any usage measurement and/or comparison may be performed. For example, a date, period of time and/or time stamp may be used and compared to current data and/or time. Still other usage methods will be apparent to skilled artisans.

By allowing refreshing of the usage data after the allowed period expires, a user can avoid the time required to reload the HDD with the DVD content. In other words, if the user wants to view the content again after the usage period expires, the user does not need to reload the content onto the HDD. Rather, the user only needs to insert the original DVD content to verify the user's right to the content. As a result, the user saves time.

Figure 14B:
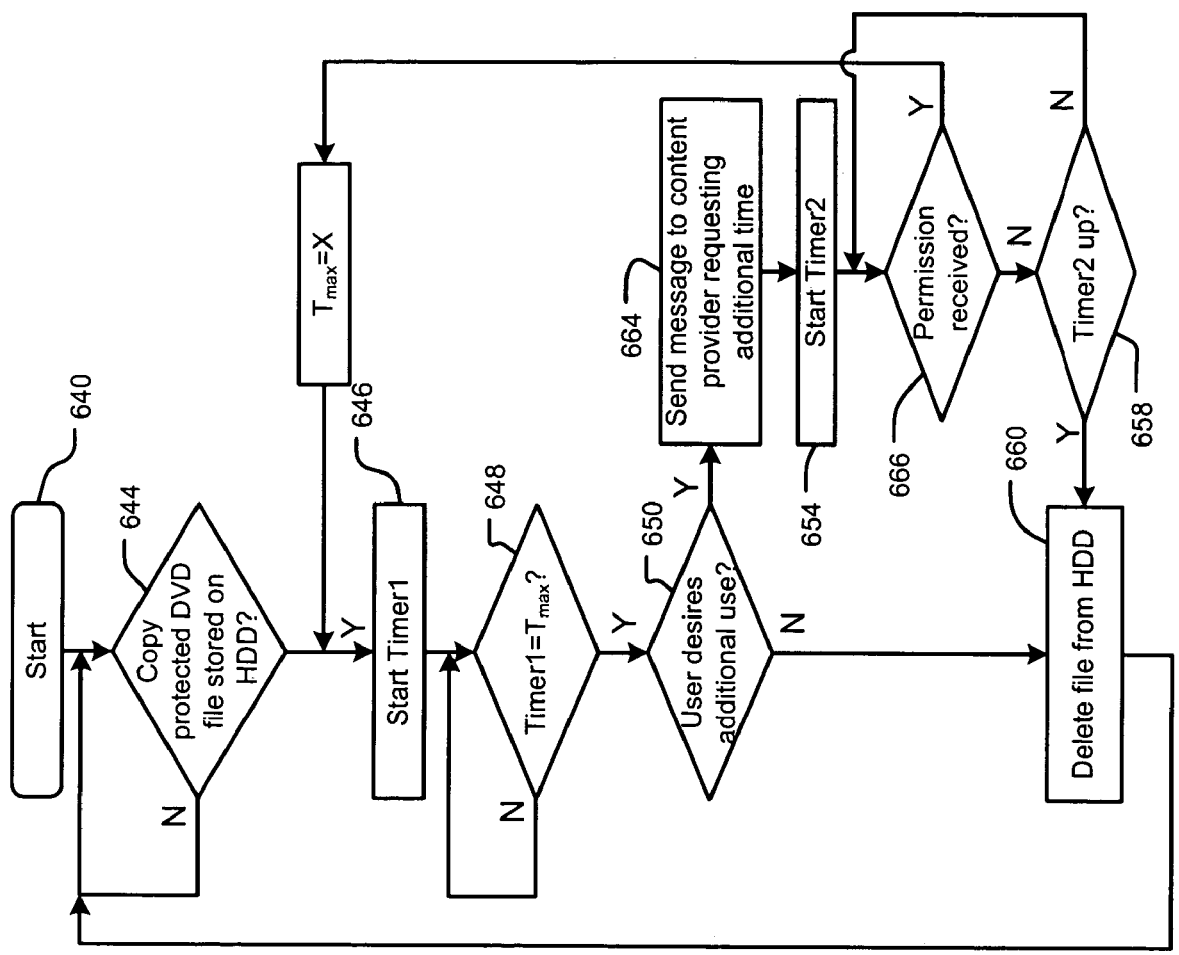

Referring now to FIG. 14B, when the usage period has been exhausted, the combined DVD/HDD can contact a content provider via a network to request and/or purchase additional usage time. Steps 652 and 656 are replaced by steps 664 and 666, respectively. In step 654, the DVD or any other network device such as a computer sends a message to the content provider requesting additional usage time. The content provider may initiate a dialog with the user if needed. The message can be generated by the combined DVD/HDD and/or a user can use a laptop or desktop computer or other network capable device to access a web page or other web enabled interface to request additional usage time. In step 666, the combined DVD/HDD determines whether additional usage permission has been received. In some implementations, the usage permission is received electronically over the network connection with or without user interaction. In other implementations, the user is given a pass code that can be entered to receive additional usage time.

By allowing remote refreshing of the usage data after the usage period expires, a user can rent video or other content from a video renting store and return the original content to the store. If the user wants to view the content again after the usage period expires, the user does not need to go to the content renting store, pick up the content, and reload the content. Rather, the user needs to remotely request additional usage.

Figure 15:
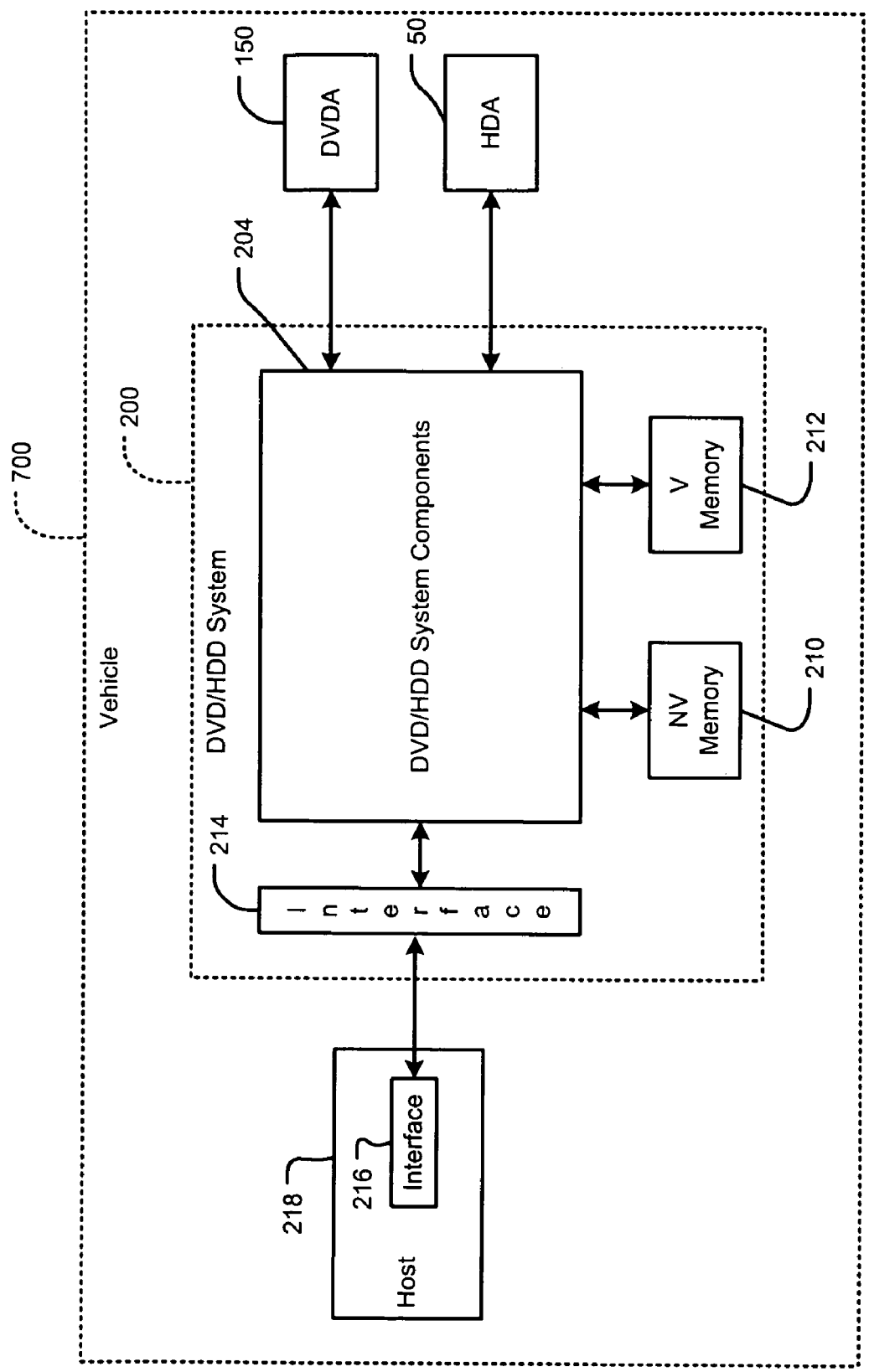
FIG. 15 is a functional block diagram of a combined DVD/HDD system according to the present invention installed in a vehicle.

Referring now to FIG. 15, any of the combined DVD/HDD systems according to the present invention can be installed in a vehicle 700. For example, the combined DVD/HDD system 200 of FIG. 3 is shown. A plurality of DVDs can be loaded and used, for example, on trips without requiring the DVDs to be stored in the vehicle. Furthermore, a wireless network can be used to connect the vehicle to a content provider to allow additional usage as described above and/or other validation techniques in FIGS. 13-14B can be used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A DVD copying system, comprising:
   a hard disk drive (HDD) assembly that includes nonvolatile memory;
   a digital versatile disc (DVD) assembly that selectively reads DVD content with copy protection from a DVD medium; and
   a combined HDD/DVD control module that communicates with said HDD assembly and said DVD assembly and that selectively copies said DVD content with said copy protection to said nonvolatile memory of said HDD assembly.

2. The DVD copying system of claim 1 wherein said copy protection includes digital rights management (DRM) data.

3. The DVD copying system of claim 1 further comprising volatile memory and second nonvolatile memory, wherein each of said volatile and second nonvolatile memory stores data relating to the operation of both the DVD and HDD assemblies.

4. The DVD copying system of claim 1 wherein said combined HDD/DVD control module is implemented as an integrated circuit.

5. The DVD copying system of claim 1 wherein said DVD content with said copy protection are copied to a hidden portion of said nonvolatile memory of said HDD assembly.

6. The DVD copying system of claim 1 wherein said combined DVD/HDD control module allows playback of said DVD content N times and then makes said DVD content unavailable.

7. The DVD copying system of claim 6 wherein said DVD/HDD control module deletes said DVD content from said nonvolatile memory of said HDD.

8. The DVD copying system of claim 1 wherein said combined DVD/HDD control module allows playback of said DVD content for a predetermined period based on said copy protection of said DVD content and then makes said DVD content unavailable.

9. The DVD copying system of claim 8 wherein said DVD/HDD control module deletes said DVD content from said nonvolatile memory of said HDD.

10. The DVD copying system of claim 1 wherein said DVD content with said copy protection includes at least one of audio DVD content and video DVD content.

11. The DVD copying system of claim 1 further comprising a read/write channel module that communicates with said DVD/HDD control module and that processes read data from and write data to said HDD and DVD assemblies.

12. The combined DVD/HDD system of claim 1 wherein when a file is read from said DVD medium, said DVD/HDD control module buffers said file to said HDD assembly.

13. The combined DVD/HDD system of claim 12 wherein said file includes a sequential access file.

14. A virtual DVD carousel comprising the DVD copying system of claim 1 wherein DVD content with copy protection from multiple DVD media is stored in said nonvolatile memory of said HDD assembly.

15. A method for operating a DVD copying system, comprising:
providing a digital versatile disc (DVD) assembly and a hard disk drive (HDD) assembly that includes nonvolatile memory;
reading DVD content with copy protection from a DVD medium; and
selectively copying said DVD content with said copy protection to said nonvolatile memory of said HDD assembly using a combined HDD/DVD control module.

16. The method of claim 15 wherein said copy protection includes digital rights management (DRM) data.

17. The method of claim 15 further comprising storing data relating to the operation of both the DVD and HDD assemblies in volatile and second nonvolatile memory.

18. The method of claim 15 further comprising copying said DVD content with said copy protection to a hidden portion of said nonvolatile memory of said HDD assembly.

19. The method of claim 15 further comprising copying DVD content with copy protection from multiple DVD media to said nonvolatile memory of said HDD assembly.

20. The method of claim 15 further comprising:
allowing playback of said DVD content N times; and
making said DVD content unavailable after said N times.

21. The method of claim 20 further comprising deleting said DVD content from said nonvolatile memory of said HDD.

22. The method of claim 15 further comprising:
allowing playback of said DVD content for a predetermined period; and
making said DVD content unavailable after said predetermined period.

23. The method of claim 22 further comprising deleting said DVD content from said nonvolatile memory of said HDD.

24. A DVD copying system, comprising:
a hard disk drive (HDD) assembly that includes nonvolatile storing means for storing nonvolatile data;
a digital versatile disc (DVD) assembly that selectively reads DVD content with copy protection from a DVD medium; and
combined HDD/DVD control means that communicates with said HDD assembly and said DVD assembly for selectively copying said DVD content with said copy protection to said nonvolatile storing means of said HDD assembly.

25. The DVD copying system of claim 24 wherein said copy protection includes digital rights management (DRM) data.

26. The DVD copying system of claim 24 further comprising volatile storing means and nonvolatile storing means for storing data relating to the operation of both the DVD and HDD assemblies.

27. The DVD copying system of claim 24 wherein said combined HDD/DVD control means is implemented as an integrated circuit.

28. The DVD copying system of claim 24 wherein said DVD content with said copy protection are copied to a hidden portion of the nonvolatile storing means in said HDD assembly.

29. A virtual DVD carousel comprising the DVD copying system of claim 24 wherein DVD content with copy protection from multiple DVD media is stored in said nonvolatile storing means of said HDD assembly.

30. The DVD copying system of claim 24 wherein said combined DVD/HDD control means allows playback of said DVD content N times and then makes said DVD content unavailable.

31. The DVD copying system of claim 30 wherein said DVD/HDD control means deletes said DVD content from said HDD.

32. The DVD copying system of claim 24 wherein said combined DVD/HDD control means allows playback of said DVD content for a predetermined period and then makes said DVD content unavailable.

33. The DVD copying system of claim 32 wherein said DVD/HDD control means deletes said DVD content from said HDD.

* * * * *